(12) United States Patent
Hao et al.

(10) Patent No.: US 12,075,470 B2
(45) Date of Patent: Aug. 27, 2024

(54) DATA TRANSMISSION METHOD AND APPARATUS, METHOD AND APPARATUS FOR CREATING ACCESS CATEGORY, AND STORAGE MEDIUM

(71) Applicant: TENCENT TECHNOLOGY (SHENZHEN) COMPANY LIMITED, Shenzhen (CN)

(72) Inventors: Jingjing Hao, Shenzhen (CN); Ruiqing Zhou, Shenzhen (CN); Xing Meng, Shenzhen (CN); Liuteng Li, Shenzhen (CN); Binhui Ning, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 529 days.

(21) Appl. No.: 17/358,204

(22) Filed: Jun. 25, 2021

(65) Prior Publication Data

US 2021/0321454 A1    Oct. 14, 2021

Related U.S. Application Data

(63) Continuation of application No. PCT/CN2020/084984, filed on Apr. 15, 2020.

(30) Foreign Application Priority Data

May 8, 2019  (CN) .......................... 201910381354.8

(51) Int. Cl.
*H04W 74/0808* (2024.01)
*H04W 72/0446* (2023.01)
(Continued)

(52) U.S. Cl.
CPC ... *H04W 74/0808* (2013.01); *H04W 72/0446* (2013.01); *H04W 72/542* (2023.01); *H04W 72/543* (2023.01)

(58) Field of Classification Search
CPC ............ H04W 28/18; H04W 72/0446; H04W 72/542; H04W 72/543; H04W 74/08;
(Continued)

(56) References Cited

U.S. PATENT DOCUMENTS 6,683,889 B1 * 1/2004 Shaffer ..................... G06F 5/06
    375/372
7,027,462 B2 * 4/2006 Benveniste ......... H04L 12/4015
    370/445
(Continued)

FOREIGN PATENT DOCUMENTS

CA        2922122 C  *  3/2020  ............ H04W 24/08
CN        101114955          1/2008
(Continued)

OTHER PUBLICATIONS

English translation of International Search Report issued on May 21, 2020 in International Application No. PCT/CN2020/084984.
(Continued)

*Primary Examiner* — Eric Nowlin
(74) *Attorney, Agent, or Firm* — Crowell & Moring LLP

(57) ABSTRACT

Embodiments of this disclosure include a method and an apparatus for transmitting data. The method may include, in response to a data frame entering a low jitter (LJ) access category, setting an LJ tolerance of the LJ access category to a first tolerance value. The method may further include, in response to a value of the LJ tolerance decreasing to zero, setting the LJ tolerance to a second tolerance value and setting a backoff count of the LJ access category from a first backoff value to a second backoff value. The second tolerance value may be less than or equal to the first tolerance value. The second backoff value may be less than the first backoff value. The method may further include transmitting
(Continued)

the data frame to a target station using the LJ access category in response to the backoff count decreasing to zero.

20 Claims, 9 Drawing Sheets

(51) Int. Cl.
*H04W 72/542* (2023.01)
*H04W 72/543* (2023.01)

(58) Field of Classification Search
CPC ......... H04W 74/0808; H04W 74/0816; H04W 74/0833; H04W 74/085
See application file for complete search history.

(56) References Cited

U.S. PATENT DOCUMENTS

| | | | | |
|---|---|---|---|---|
| 7,224,679 | B2 * | 5/2007 | Solomon | H04L 1/0017 455/452.2 |
| 7,274,708 | B2 * | 9/2007 | Benveniste | H04L 47/2433 370/445 |
| 7,286,551 | B2 * | 10/2007 | Park | H04L 65/1101 370/462 |
| 7,417,963 | B2 * | 8/2008 | Chen | H04W 72/543 370/328 |
| 7,664,132 | B2 * | 2/2010 | Benveniste | H04W 28/0284 370/445 |
| 8,184,582 | B2 * | 5/2012 | Banerjee | H04W 16/14 455/448 |
| 8,276,035 | B1 | 9/2012 | Savarese et al. | |
| 8,654,825 | B2 * | 2/2014 | Shany | H04L 1/0026 375/224 |
| 8,774,033 | B2 * | 7/2014 | Oh | H04W 4/48 370/252 |
| 8,797,865 | B2 * | 8/2014 | Li | H04L 47/22 370/230.1 |
| 9,065,739 | B2 * | 6/2015 | Cheng | H04L 47/18 |
| 9,148,892 | B2 * | 9/2015 | Rison | H04W 74/085 |
| 9,191,114 | B2 * | 11/2015 | Hussain | H04L 12/6418 |
| 9,325,458 | B2 * | 4/2016 | Shany | H04L 1/0035 |
| 9,521,694 | B2 * | 12/2016 | Park | H04W 76/00 |
| 9,578,658 | B2 * | 2/2017 | Yang | H04W 74/0825 |
| 9,806,979 | B1 | 10/2017 | Felstaine | H04L 43/10 |
| 9,807,764 | B2 * | 10/2017 | Wentink | H04W 74/08 |
| 9,814,078 | B2 * | 11/2017 | Park | H04W 74/085 |
| 9,955,372 | B2 * | 4/2018 | Montemurro | H04W 52/0216 |
| 10,548,071 | B2 * | 1/2020 | Maaref | H04B 1/0003 |
| 10,567,986 | B2 * | 2/2020 | Gupta | H04W 56/001 |
| 10,609,719 | B2 * | 3/2020 | Honma | H04W 16/14 |
| 10,791,545 | B2 * | 9/2020 | Bang | H04L 5/0092 |
| 10,812,851 | B2 * | 10/2020 | Klappert | H04N 21/25866 |
| 10,813,043 | B2 * | 10/2020 | Maaref | H04B 1/0003 |
| 10,932,239 | B2 * | 2/2021 | Kim | H04W 16/14 |
| 11,522,801 | B2 * | 12/2022 | Pasio | H04W 28/12 |
| 2002/0154653 | A1 * | 10/2002 | Benveniste | H04L 12/4013 370/445 |
| 2002/0163933 | A1 * | 11/2002 | Benveniste | H04L 47/6275 370/465 |
| 2003/0117964 | A1 * | 6/2003 | Chen | H04W 72/543 370/468 |
| 2004/0151144 | A1 * | 8/2004 | Benveniste | H04W 74/085 370/347 |
| 2005/0152373 | A1 * | 7/2005 | Ali | H04L 47/566 370/310 |
| 2005/0169171 | A1 * | 8/2005 | Cheng | H04L 47/10 370/229 |
| 2006/0039281 | A1 * | 2/2006 | Benveniste | H04W 8/04 370/230 |
| 2006/0062189 | A1 * | 3/2006 | Takeuchi | H04W 74/0875 370/412 |
| 2006/0098626 | A1 * | 5/2006 | Park | H04L 47/2416 370/352 |
| 2007/0019665 | A1 * | 1/2007 | Benveniste | H04L 47/2433 370/445 |
| 2008/0013567 | A1 * | 1/2008 | Benveniste | H04W 28/0231 370/447 |
| 2008/0056297 | A1 * | 3/2008 | Gaur | H04W 74/0816 370/447 |
| 2010/0172335 | A1 * | 7/2010 | Mok | H04L 1/1877 370/338 |
| 2010/0220615 | A1 * | 9/2010 | Enstrom | H04L 47/283 370/252 |
| 2010/0284380 | A1 * | 11/2010 | Banerjee | H04W 16/14 455/41.2 |
| 2011/0243208 | A1 * | 10/2011 | Shany | H04L 1/0026 375/224 |
| 2012/0099432 | A1 * | 4/2012 | Bercovich | H04J 3/0658 370/235 |
| 2012/0127874 | A1 * | 5/2012 | Oh | H04W 4/46 370/252 |
| 2012/0218947 | A1 * | 8/2012 | Merlin | H04L 25/03343 370/329 |
| 2013/0003545 | A1 * | 1/2013 | Li | H04L 47/22 370/230.1 |
| 2013/0279427 | A1 * | 10/2013 | Wentink | H04W 52/0229 370/329 |
| 2013/0343250 | A1 | 12/2013 | Homchaudhuri et al. | |
| 2014/0064301 | A1 * | 3/2014 | Rison | H04W 74/085 370/448 |
| 2014/0079046 | A1 * | 3/2014 | Yang | H04W 74/0825 370/338 |
| 2014/0161045 | A1 * | 6/2014 | Shany | H04L 1/0015 370/328 |
| 2015/0063131 | A1 * | 3/2015 | Montemurro | H04W 24/08 370/252 |
| 2015/0139209 | A1 * | 5/2015 | Park | H04W 76/00 370/338 |
| 2015/0271255 | A1 * | 9/2015 | Mackay | H04L 47/6275 709/226 |
| 2015/0334642 | A1 * | 11/2015 | Maaref | H04B 1/0003 370/329 |
| 2015/0334643 | A1 * | 11/2015 | Maaref | H04W 48/18 370/329 |
| 2016/0269303 | A1 * | 9/2016 | Park | H04W 74/085 |
| 2016/0323764 | A1 * | 11/2016 | Montemurro | H04W 52/0251 |
| 2016/0337223 | A1 * | 11/2016 | Mackay | H04L 43/0894 |
| 2017/0013616 | A1 * | 1/2017 | Wentink | H04W 72/0446 |
| 2017/0302570 | A1 * | 10/2017 | Liu | H04L 41/5022 |
| 2017/0332123 | A1 * | 11/2017 | Klappert | H04N 21/25866 |
| 2017/0332124 | A1 * | 11/2017 | Klappert | H04N 21/44209 |
| 2017/0373736 | A1 | 12/2017 | Fang | |
| 2018/0070252 | A1 * | 3/2018 | Gupta | H04W 24/08 |
| 2018/0167976 | A1 * | 6/2018 | Wentink | H04W 74/0816 |
| 2018/0198726 | A1 | 7/2018 | Baron et al. | |
| 2019/0191414 | A1 * | 6/2019 | Bang | H04W 84/12 |
| 2020/0389407 | A1 * | 12/2020 | Pasio | H04W 28/0236 |
| 2020/0404648 | A1 * | 12/2020 | Kim | H04L 5/0044 |
| 2021/0259026 | A1 * | 8/2021 | Viger | H04W 74/0833 |
| 2021/0289564 | A1 * | 9/2021 | Hu | H04W 74/0875 |
| 2021/0321454 | A1 * | 10/2021 | Hao | H04W 74/0808 |
| 2023/0086527 | A1 * | 3/2023 | Boger | H04W 72/566 370/329 |

FOREIGN PATENT DOCUMENTS

| | | | | |
|---|---|---|---|---|
| CN | 101159648 | A | | 4/2008 |
| CN | 101741918 | A | | 6/2010 |
| CN | 101741918 | A | * | 6/2010 |
| CN | 101741918 | B | * | 11/2012 |
| CN | 103068054 | A | * | 4/2013 |
| CN | 103379102 | | | 10/2013 |
| CN | 103797885 | | | 5/2014 |
| CN | 104871630 | A | | 8/2015 |
| CN | 103068054 | B | * | 5/2017 |
| CN | 106714208 | | | 5/2017 |
| CN | 107509251 | A | | 12/2017 |
| CN | 107659997 | | | 2/2018 |
| CN | 107864698 | A | * | 3/2018 ........ H04W 72/0446 |
| CN | 108684219 | A | | 10/2018 |

(56) References Cited

FOREIGN PATENT DOCUMENTS

| | | | | |
|---|---|---|---|---|
| CN | 108966361 | | 12/2018 | |
| CN | 109375522 | A * | 2/2019 | |
| CN | 109691217 | A * | 4/2019 | ............ H04W 24/08 |
| CN | 110089186 | A * | 8/2019 | ............ H04W 24/08 |
| CN | 110999508 | A * | 4/2020 | .............. H04L 5/00 |
| DE | 102012020099 | A1 * | 3/2014 | ............ H04L 12/413 |
| EP | 3245834 | B1 * | 6/2019 | ............ H04W 74/08 |
| EP | 3044996 | B1 * | 1/2020 | ............ H04W 36/26 |
| EP | 3739841 | A1 * | 11/2020 | ............ H04L 61/203 |
| EP | 3606271 | B1 * | 1/2021 | .............. H04L 5/00 |
| GB | 2506109 | A * | 3/2014 | ............ H04L 12/413 |
| GB | 201903181 | | 9/2020 | |
| GB | 2582813 | A * | 10/2020 | ............ H04L 47/50 |
| GB | 2588042 | A * | 4/2021 | .............. H04L 5/00 |
| GB | 2588267 | A * | 4/2021 | .............. H04L 5/00 |
| JP | 4512099 | B2 * | 7/2010 | ............ H04L 47/10 |
| JP | 2014096835 | A * | 5/2014 | ........ H04W 52/0216 |
| JP | 2018524926 | A * | 8/2018 | |
| KR | 20100082106 | A * | 7/2010 | |
| KR | 101418991 | B1 * | 8/2014 | |
| KR | 20150023307 | A * | 3/2015 | |
| KR | 101585823 | B1 * | 1/2016 | |
| KR | 20180030024 | A * | 3/2018 | |
| TW | 201349897 | A * | 12/2013 | ........ H04W 72/1215 |
| WO | WO-03043357 | A1 * | 5/2003 | ............ H04L 47/14 |
| WO | WO-2005069876 | A2 * | 8/2005 | ............ H04L 47/10 |
| WO | WO-2013126859 | A2 * | 8/2013 | ........ H04W 72/1215 |
| WO | WO-2015031354 | A1 * | 3/2015 | ............ H04W 24/08 |
| WO | WO-2016116143 | A1 * | 7/2016 | ............ H04W 74/08 |
| WO | WO-2017011157 | A1 * | 1/2017 | ........ H04W 72/0446 |
| WO | WO-2017200923 | A1 * | 11/2017 | ........ H04L 29/08954 |
| WO | WO-2018048172 | A1 * | 3/2018 | ............ H04L 5/0044 |
| WO | WO-2018048642 | A1 * | 3/2018 | ............ H04W 24/08 |
| WO | WO-2019009596 | A1 * | 1/2019 | .............. H04L 5/00 |
| WO | WO-2019199311 | A1 * | 10/2019 | ............ H04W 76/10 |
| WO | WO/2020/182688 | A1 | 9/2020 | |

OTHER PUBLICATIONS

Office Action issued in Japanese application 2021-542118 on Aug. 23, 2022, 3 pages.
Translation of office action JP2021-542118, 6 pages.
Engelhardt, Frank et al., "Towards Tactile Wireless Multi-Hop Networks, The Tactile Coordination Function as EDCA Supplement", downloaded Jul. 27, 2022 from IEEE Xplore, 7 pages.
Examination Report and Search Report of Chinese application CN2019103813548 dated Nov. 29, 202, 6 pages.
Supplementary European Search Report, dated May 23, 2022, pp. 1-11, issued in European Application No. 20802977.7-1216 / 3968725 PCT/CN2020084984, European Patent Office, Munich, Germany.
Chinese Office Action with Machine Translated by Google, dated Feb. 3, 2024, pp. 1-6, Issued in Chinese patent application No. 202210762737.1, China National Intellectual Property Administration, Beijing, China.
Zhang, Haibin et al., Improving EDCA for Efficient Channel Access in Vehicular Communications, IEEE Communications Magazine, IEEE Service Center, Piscataway, US, vol. 56, No. 10, Oct. 1, 2018 (abstract only).
Lai Yuan-Cheng et al: "Dynamic Backoff Time Adjustment with Considering Channel Condition for IEEE 802. 11e EDCA", Jan. 23, 2007 (Jan. 23, 2007), Advances in Biometrics : International Conference, ICB 2007, Seoul, Korea, Aug. 27-29, 2007 ; Proceedings; [Lecture Notes in Computer Science; Lect.Notes Computer], Springer, Berlin, Heidelberg, pp. 445-454, XP047403087 (abstract only).

\* cited by examiner

Obtain an LJ associated parameter set, the LJ associated parameter set being for indicating a data transmission condition supported by an LJ access category, the data transmission condition being a condition to be met for transmitting LJ service data — S201

Create the LJ access category according to the LJ associated parameter set — S202 ers, method and apparatus for creating an access category, and a computer-readable storage medium.

DATA TRANSMISSION METHOD AND APPARATUS, METHOD AND APPARATUS FOR CREATING ACCESS CATEGORY, AND STORAGE MEDIUM

CROSS-REFERENCE TO RELATED APPLICATION

This application is a continuation application of PCT Patent Application No. PCT/CN2020/084984, filed on Apr. 15, 2020, which claims priority to Chinese Patent Application No. 201910381354.8, entitled "DATA TRANSMISSION METHOD AND APPARATUS, METHOD AND APPARATUS FOR CREATING ACCESS CATEGORY, AND STORAGE MEDIUM" and filed with the China Patent Office on May 8, 2019, wherein the content of each of the above-referenced applications is incorporated herein by reference in its entirety.

FIELD OF THE TECHNOLOGY

This application relates to the field of communication technologies, and in particular, to a data transmission method and apparatus, a method and an apparatus for creating an access category, and a computer-readable storage medium.

BACKGROUND OF THE DISCLOSURE

With the development of the Internet, many services and applications (for example, a real-time mobile game) have higher requirements for latency. These services and applications not only require a network to complete data transmission within a relatively low transmission latency, but also require lower transmission latency jitter from a transmitting end to a receiving end within service duration. If within low jitter (LJ) service duration, a part of data meets an end latency requirement, while the latency of a part of data is large, which causes the jitter of the transmission latency, resulting in a drop in the user experience of the LJ service. For example, a user of a mobile game feels a lag in feedback during operation, a lag in display, even loss of connection, or the like.

SUMMARY

In view of this, embodiments of this disclosure provide a data transmission method and apparatus, a method and an apparatus for creating an access category, and a computer-readable storage medium, which can dynamically reduce a backoff value of a backoff count, thereby increasing the flexibility of the backoff and improving the data transmission efficiency of an LJ service.

The embodiments of this disclosure provide a data transmission method. The method may include, in response to a data frame entering a low jitter (LJ) access category, setting an LJ tolerance of the LJ access category to a first tolerance value. The LJ tolerance may represent a transmission latency upper limit of the LJ access category. The method may further include, in response to a value of the LJ tolerance decreasing to zero, setting the LJ tolerance to a second tolerance value and setting a backoff count of the LJ access category from a first backoff value to a second backoff value. The second tolerance value may be less than or equal to the first tolerance value. The second backoff value may be less than the first backoff value. The first backoff value may be a value of the backoff count when the LJ tolerance decreases to zero. The method may further include transmitting the data frame to a target station using the LJ access category in response to the backoff count decreasing to zero.

The embodiments of this disclosure provide a method for creating an access category. The method may include obtaining a low jitter (LJ) associated parameter set. The LJ associated parameter set may be for indicating a data transmission condition supported by an LJ access category. The data transmission condition may be a condition to be met for transmitting LJ service data. The method may further include creating the LJ access category according to the LJ associated parameter set.

The embodiments of this disclosure provide a data transmission apparatus. The apparatus may include a memory operable to store computer-readable instructions and a processor operable to read the computer-readable instructions. When executing the computer-readable instructions, the processor may, in response to a data frame entering a low jitter (LJ) access category, set an LJ tolerance of the LJ access category to a first tolerance value. The LJ tolerance may represent a transmission latency upper limit of the LJ access category. The processor may, in response to a value of the LJ tolerance decreasing to zero, set the LJ tolerance to a second tolerance value and set a backoff count of the LJ access category from a first backoff value to a second backoff value. The second tolerance value may be less than or equal to the first tolerance value. The second backoff value may be less than the first backoff value. The first backoff value may be a value of the backoff count when the LJ tolerance decreases to zero. The processor may further transmit the data frame to a target station using the LJ access category in response to the backoff count decreasing to zero.

The embodiments of this disclosure provide an apparatus for creating an access category. The apparatus may include a memory operable to store computer-readable instructions and a processor operable to read the computer-readable instructions. When executing the computer-readable instructions, the processor may obtain a low jitter (LJ) associated parameter set. The LJ associated parameter set may be for indicating a data transmission condition supported by an LJ access category. The data transmission condition may be a condition to be met for transmitting LJ service data. The processor may further create the LJ access category according to the LJ associated parameter set.

The embodiments of this disclosure provide non-transitory computer-readable storage medium storing executable instructions. The executable instructions, when being executed, may cause a processor to, in response to a data frame entering a low jitter (LJ) access category, set an LJ tolerance of the LJ access category to a first tolerance value. The LJ tolerance may represent a transmission latency upper limit of the LJ access category. The instructions may further cause the processor to, in response to a value of the LJ tolerance decreasing to zero, set the LJ tolerance to a second tolerance value and set a backoff count of the LJ access category from a first backoff value to a second backoff value. The second tolerance value may be less than or equal to the first tolerance value. The second backoff value may be less than the first backoff value. The first backoff value may be a value of the backoff count when the LJ tolerance decreases to zero. The instructions may further cause the processor to transmit the data frame to a target station using the LJ access category in response to the backoff count decreasing to zero.

As can be seen from the foregoing technical solution, the embodiments of this disclosure have the following advantages:

In the embodiments of this disclosure, a data transmission method is provided. A station sets, when a data frame enters an LJ access category, a transmission latency upper limit of the LJ access category to a first tolerance value, reduces the transmission latency upper limit of the LJ access category and reduces a backoff count of the LJ access category from a first backoff value to a second backoff value when an LJ tolerance decreases to 0, the first backoff value being a backoff value corresponding to a case that the LJ tolerance decreases to 0, and transmits the data frame to a target station by using the LJ access category when the backoff count decreases to 0. In this way, the station can dynamically adjust the transmission latency upper limit of the LJ access category and dynamically reduce a backoff value corresponding to the backoff count, thereby increasing the flexibility of the backoff and improving the data transmission efficiency of an LJ service.

DESCRIPTION OF EMBODIMENTS

Figure 1:
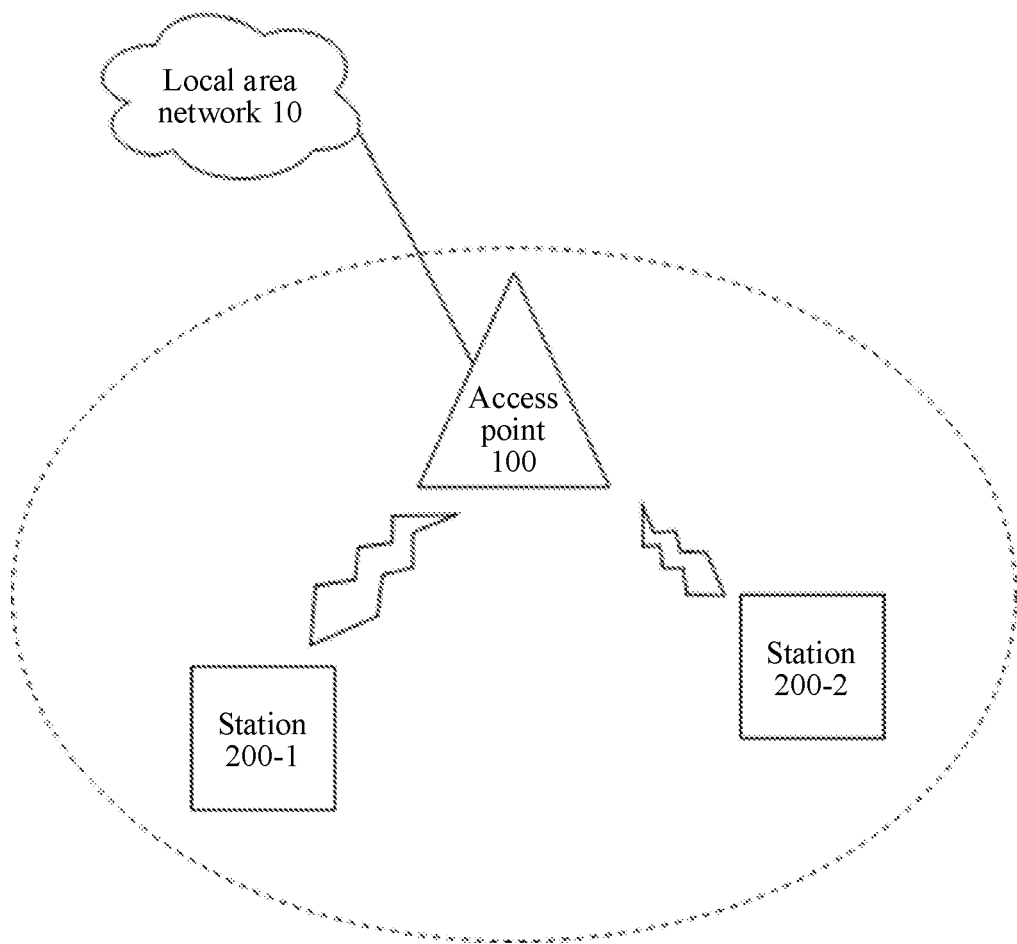
FIG. 1 is a schematic diagram of a wireless local area network according to an embodiment of this disclosure.

Embodiments of this disclosure provide a data transmission method and apparatus, and a method and an apparatus for creating an access category, which can dynamically adjust a tolerance value corresponding to an LJ tolerance and dynamically reduce a backoff value corresponding to a backoff count, thereby increasing the flexibility of the backoff and improving the data transmission efficiency of an LJ service.

In the specification of the embodiments of this disclosure, claims, and accompanying drawings, the terms "first", "second", "third", "fourth", and the like (if existing) are intended to distinguish between similar objects, but do not necessarily indicate a specific order or sequence. It is to be understood that data used in this way is exchangeable in a proper case, so that the embodiments of this disclosure described herein can be implemented in an order different from the order shown or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

Herein, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

In the institute of electrical and electronics engineers (IEEE) 802.11, enhanced distributed channel access (EDCA) is a protocol for control channel access for wireless transmission. The protocol allows physical layers (PHYs) that are compatible with each other to share wireless media. To differentiate priorities of services, four access categories (ACs) are defined in the EDCA, and each AC contends for a channel independently according to a backoff mechanism. When backoff counts of a plurality of ACs simultaneously reach 0, for an AC with a low priority, it is considered as a collision, and then a contention window (CW) is doubled, to restart the backoff. For an AC with a high priority, it is considered that a transmission opportunity (TXOP) is obtained successfully in contention, and therefore data is started to be transmitted on a contended channel, thereby affecting the data transmission efficiency.

An integer value is selected from a specific range as an initial backoff time in the EDCA. Therefore, the backoff time is fixed each time the integer value is selected. For an LJ service, long-time data transmission needs to be completed according to required latency jitter. Therefore, the contrast between the fixed backoff time and a complex and variable wireless transmission environment causes the support for the LJ service to be inflexible, and reduces the data transmission efficiency of the LJ service.

It is to be understood that the embodiments of this disclosure are applicable to a wireless local area network under the IEEE 802.11 protocol standard. In the IEEE 802.11 protocol, the EDCA is a control channel access protocol for wireless transmission, and the EDCA allows, based on carrier sensing multiple access/collision avoidance (CSMA/CA), PHYs that are compatible with each other to use wireless media. There are a plurality of implementations of CSMA/CA, such as wireless fidelity (Wi-Fi).

Based on the CSMA/CA protocol, several related concepts are described below.

1. Carrier Sensing

A PHY in a station performs physical sensing in each slot (aSlotTime), to know whether a shared medium is in an idle state.

2. Backoff

A station supporting the EDCA selects a random integer value from a specific range as an initial backoff time. When the PHY senses that the shared medium is idle in one slot, the EDCA starts backoff, that is, a backoff count is decreased by 1. When the backoff count is 0, the EDCA determines that contention channel access succeeds, that is, a TXOP is obtained, and a data frame starts to be transmitted. If it is sensed that the shared medium is in a busy state in one slot in a backoff process, the backoff count is temporarily suspended, and the previous backoff count continues when it is sensed that the shared medium is idle again. When backoff counts of two stations (STAs) are 0, a collision occurs.

3. TXOP Limit

When a STA obtains a TXOP, a data frame may be transmitted immediately, but an occupation time of the shared medium is limited, that is, there is a TXOP limit.

4. Contention Window (CW)

The random selection of a backoff time is defined by a CW parameter, that is, an integer value is randomly selected from uniform distribution of [0, CW]. The value of the CW is between a minimum CW value (CWmin) and a maximum CW value (CWmax). Each time a transmission succeeds, the CW is reset to CWmin. Each time a collision or transmission failure occurs, the CW is doubled until CWmax is reached.

5. Access Category (AC)

To differentiate priorities of services, a plurality of ACs are defined in the EDCA. Each AC includes a queue for storing MAC service data units (MSDUs) and an enhanced distributed channel access function (EDCAF) for differentiating priorities. When the STA receives an MSDU delivered by an upper layer protocol, the MSDU is first mapped to a corresponding AC by using the EDCA according to a user priority (UP) field of the upper layer. Each AC contends for a channel independently according to the backoff mechanism. Meanwhile, each AC corresponds to an EDCAF, which is responsible for defining different parameter values to achieve different priorities of ACs. The parameters defined in the EDCAF include CWmin, CWmax, a TXOP limit, and an arbitration inter-frame space (AIFS). An AC with a high priority may have a higher probability of obtaining a TXOP in contention than an AC with a low priority.

When backoff counts of a plurality of ACs simultaneously reach 0, the AC with the low-priority has a collision, then the CW is doubled, to restart the backoff. For the AC with the high priority, it is considered that the TXOP is obtained successfully in contention, and a data frame starts to be transmitted.

6. AIFS

The AIFS is used for defining a waiting time after a sensing result of the shared medium changes from busy to idle and before the random backoff process is started. The AIFSs of different ACs are also different, and the AC with the high priority starts random backoff earlier, and therefore also has a higher probability of obtaining a TXOP in contention.

For ease of understanding, the embodiments of this disclosure provide a data transmission method. The method is applicable to a wireless local area network 10 shown in FIG. 1. FIG. 1 is a schematic diagram of an embodiment of a wireless local area network 10 according to an embodiment of this disclosure. As shown in FIG. 1, the data transmission method provided in the embodiments of this disclosure is applicable to a station in the wireless local area network 10 (WLAN), especially a STA-intensive scenario, and may meet the requirements of Wi-Fi standards on high-density users and high throughput rates. In the local area network (LAN) 10, a network node includes an access point (AP) 100 and a STA 200 (two STAs are exemplarily shown in FIG. 1, which are a STA 200-1 and a STA 200-2 respectively). The AP 100 provides a data service for STAs within a coverage, and the AP 100 and the STA 200 served by the AP constitute a basic service set (BSS). In general, one BSS includes a plurality of STAs.

Figure 2:
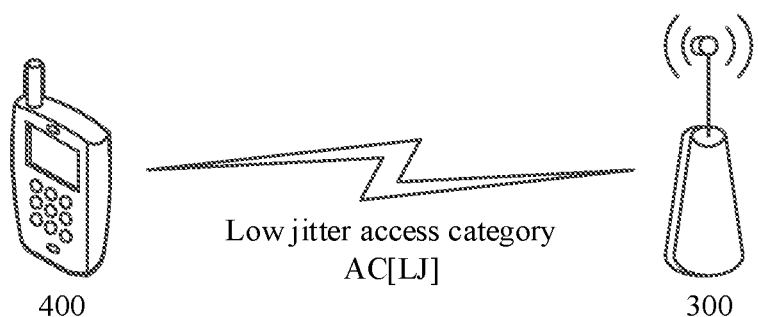
FIG. 2 is a schematic architectural diagram of a data transmission system according to an embodiment of this disclosure.

Based on the above description, a novel AC is defined in the embodiments of this disclosure for supporting an LJ service, which may be referred to as an AC[LJ]. FIG. 2 is a schematic architectural diagram of a data transmission system according to an embodiment of this disclosure. As shown in FIG. 2, the data transmission system includes an AP and a STA, and the AP may communicate with the STA by using a radio link. Currently, in a series of IEEE 802.11 standards adopted by the WLAN, a network node of a BSS is a STA, a STA includes an AP STA (300 shown in FIG. 2) and a non-AP STA (400 shown in FIG. 2), and each BBS may include one AP and a plurality of non-AP STAs associated with the AP.

The AP STA is also referred to as a wireless AP, a hotspot, or the like. The AP is an access point for a mobile user to enter a wired network, and is generally deployed in a home, inside a building, and in a campus. A typical coverage radius is dozens of meters to hundreds of meters. Alternatively, the AP may be deployed outdoors. The AP is equivalent to a bridge connecting a wired network to a wireless network, and a main function of the AP is connecting STAs together, and then connecting the wireless network to the wired network. In an example, the AP may be a terminal device or a network device equipped with a Wi-Fi chip, for example, a routing device that provides an AP function or service. The AP may be a device that supports an 802.1 lax mechanism, and in some embodiments, the AP may be alternatively a device that supports a plurality of WLAN mechanisms such as 802.11ac, 802.11n, 802.11g, 802.11b, and 802.11a.

The STA may be a wireless communication chip, a wireless sensor, or a wireless communication terminal, for example, a mobile phone supporting a Wi-Fi communication function, a tablet computer supporting a Wi-Fi communication function, a set-top box supporting a Wi-Fi communication function, a smart television supporting a Wi-Fi communication function, a smart wearable device supporting a Wi-Fi communication function, an in-vehicle communication device supporting a Wi-Fi communication function, and a computer supporting a Wi-Fi communication function. The STA may support an 802.1 lax mechanism. The STA may alternatively support a plurality of WLAN mechanisms such as 802.11ac, 802.11n, 802.11g, 802.11b, and 802.11a.

It may be understood that in the IEEE 802.11, an end providing wireless connection access is defined as an AP, and the other end that is served is referred to as a non-AP, that is, a STA. For ease of description, the AP and the non-AP STA in the embodiments of this disclosure are collectively referred to as STAs.

Figure 3:
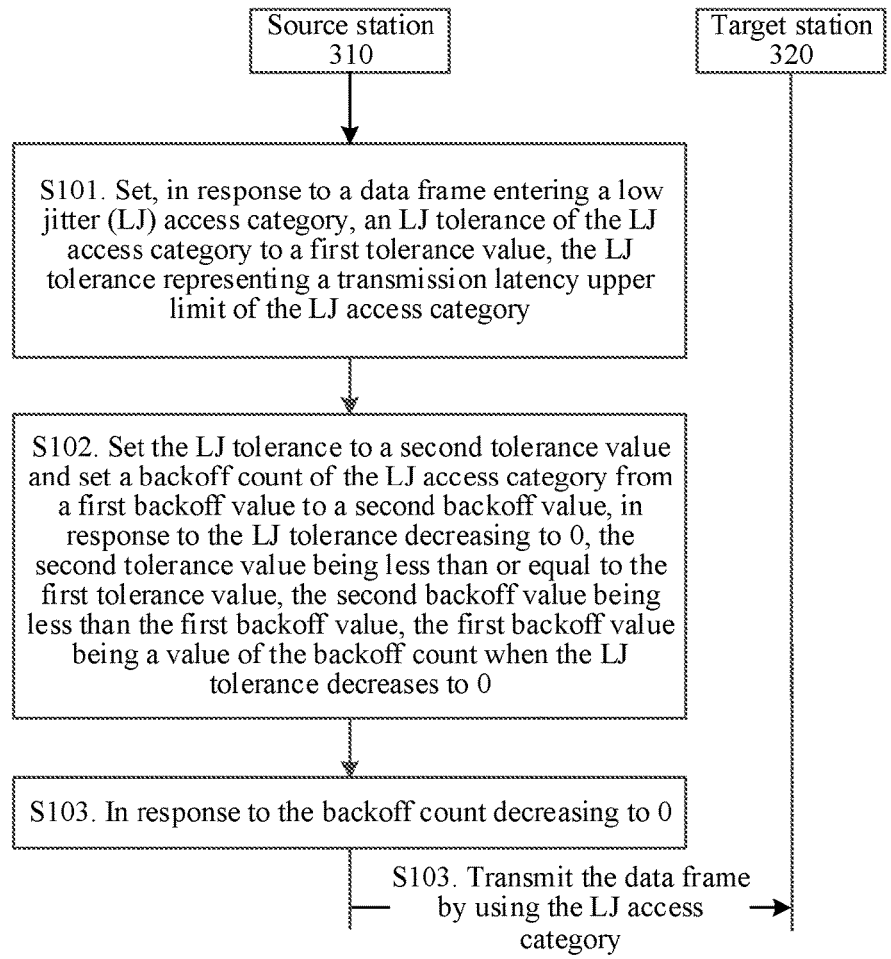
FIG. 3 is a schematic flowchart of an implementation of a data transmission method according to an embodiment of this disclosure.

With reference to the foregoing description, to achieve compatibility with the IEEE 802.11 protocol, an AC[LJ] is defined in the embodiments of this disclosure to meet the requirements for low latency jitter. The following describes a data transmission method based on the AC[LJ] in the embodiments of this disclosure. The data transmission method is applicable to a STA, and the STA in the embodiments of this disclosure can perform data transmission based on a defined AC supporting an LJ service. FIG. 3 is a schematic flowchart of an implementation of a data transmission method according to an embodiment of this disclosure. As shown in FIG. 3, the method includes the following steps.

S101. Set, when a data frame enters an LJ access category, an LJ tolerance of the LJ access category to a first tolerance value, the LJ tolerance representing a transmission latency upper limit of the LJ access category.

In this embodiment of this disclosure, a data transmission method of an AC supporting an LJ service (AC[LJ]) is described. The LJ means that a transmission latency jitter is less than a latency jitter threshold. The latency jitter threshold is set individually according to a service run on a station device. The AC supporting the LJ refers to an AC that can meet a condition that the transmission latency jitter is less than the latency jitter threshold.

In this embodiment of this disclosure, a data frame may be social dynamic information transmitted or received by a station or may be a game data frame transmitted or received by a station. When a data frame enters an AC[LJ] of the station, a count value of an LJ tolerance is set to a first tolerance value. A counting manner of the LJ tolerance is similar to a manner of calculating a backoff count, and both are in a unit of slot (aSlotTime), that is, a count of the LJ tolerance is decreased by 1 after each slot. The LJ tolerance represents a transmission latency upper limit of an LJ access category.

When the data frame enters the LJ access category, the station sets the LJ tolerance of the LJ access category to a first tolerance value, the first tolerance value being a positive integer such as T1. It may be understood that the data frame may be a MAC service data unit (MSDU), or may be a data unit of another type. This is not limited herein.

S102. Set the LJ tolerance to a second tolerance value and set a backoff count of the LJ access category from a first backoff value to a second backoff value, when the LJ tolerance decreases to 0, the second tolerance value being less than or equal to the first tolerance value, the second backoff value being less than the first backoff value, the first backoff value being a backoff value corresponding to a case that the LJ tolerance decreases to 0.

In this embodiment of this disclosure, when the LJ tolerance decreases to 0, the station sets the LJ tolerance to a second tolerance value, the second tolerance value being also a positive integer such as T2, and the second tolerance value being less than or equal to the first tolerance value. In addition, the station needs to update a backoff count from a first backoff value to a second backoff value, the first backoff value being a backoff value corresponding to a case that the LJ tolerance decreases to 0. The first backoff value is a positive integer such as t1. The second backoff value is also a positive integer such as t2, and the second backoff value is less than the first backoff value.

S103. Transmit the data frame to a target station using the LJ access category when the backoff count decreases to 0.

In this embodiment of this disclosure, when the backoff count decreases to 0, it represents that the data frame may be transmitted, that is, the station transmits the data frame to a target station 320 by using the LJ access category.

Figure 4:
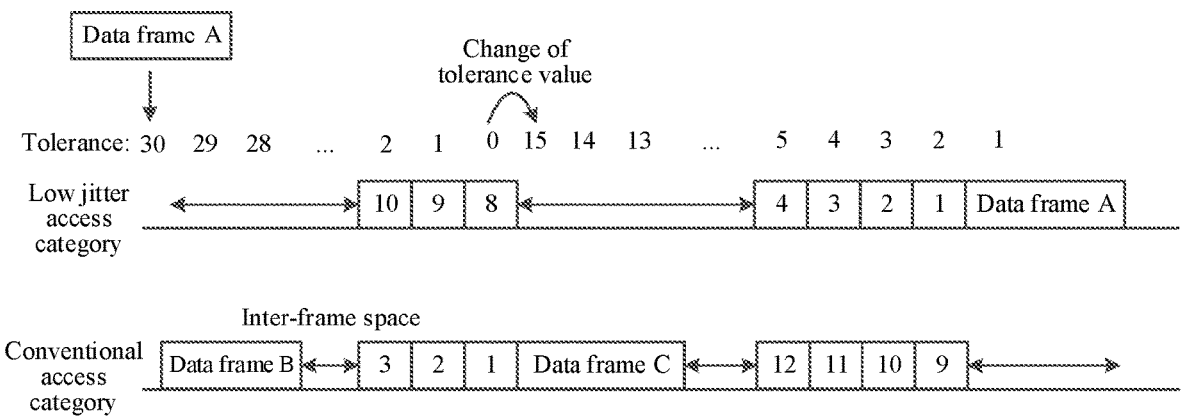
FIG. 4 is a schematic diagram of data transmission based on an LJ access category according to an embodiment of this disclosure.

For ease of understanding, FIG. 4 is a schematic diagram of data transmission based on an LJ access category according to an embodiment of this disclosure. As shown in FIG. 4, when a data frame A enters an AC[LJ], an LJ tolerance of the AC[LJ] is set to a first tolerance value such as 30, and the LJ tolerance is decreased by 1 after each slot. Data may be alternatively transmitted by using an AC other than the AC[LJ]. Assuming that another AC is a conventional AC, if a data frame B is transmitted by using the conventional AC, the data frame A cannot be transmitted on the AC[LJ]. Therefore, the AC[LJ] continues to be counted down according to the LJ tolerance. If the data frame A has not been transmitted when the LJ tolerance is 0, the LJ tolerance needs to be reset, that is, set to the second tolerance value. For example, the first tolerance value is 30, and the second tolerance value is 15.

In this embodiment of this disclosure, transmitting the data by using the AC means that the station transmits data by using the AC or the station transmits data on the AC.

It may be understood that in some embodiments, the second tolerance value may be set as follows: a previous tolerance value is decreased by a half each time, that is, T2=T1/2, or is shifted to the right by one bit, that is, T2=T1–1, or no change is made, that is, T2=T1, or random reduction is performed so that T2<T1. Subsequently, each time the LJ tolerance is reset, the LJ tolerance may be set continuously in a manner of T1/4, T1/8, . . . , and the like. Alternatively, each time the LJ tolerance is reset, the LJ tolerance may be decreased by a value. Alternatively, each time the LJ tolerance is reset, the LJ tolerance may be set to a value. A description is made by using T2=T1/2 as an example in FIG. 4. However, this is not to be understood as a limitation on the embodiments of this disclosure.

Meanwhile, when the LJ tolerance decreases to 0, a backoff count of the AC[LJ] is a first backoff value, that is, 8 shown in FIG. 4, but a backoff count of the conventional AC is already 0, and a data frame C may be transmitted. Therefore, the backoff count of a current queue in the AC[LJ] needs to be set from the first backoff value to a second backoff value. For example, the first backoff value is 8 and the second backoff value is 4.

It may be understood that during each acceleration, a half of the first backoff value may be set as the second backoff value, that is, t2=t1/2, or the first backoff value is decreased by a value to obtain the second backoff value, that is, t2=t1–X, X being a positive integer, or the second backoff value is directly set to a value, that is, t2=X; when X is equal to 1, it represents that a TXOP may be obtained more quickly. A description is made by using t2=t1/2 as an example in FIG. 4. However, this is not to be understood as a limitation on the embodiments of this disclosure.

In the embodiments of this disclosure, a data transmission method is provided. A station sets, when a data frame enters an LJ access category, an LJ tolerance of the LJ access category to a first tolerance value, the LJ tolerance representing a transmission latency upper limit of the LJ access category, sets the LJ tolerance to a second tolerance value and sets a backoff count of the LJ access category from a first backoff value to a second backoff value when the LJ tolerance decreases to 0, the second tolerance value being less than or equal to the first tolerance value, the second backoff value being less than the first backoff value, the first backoff value being a backoff value corresponding to a case that the LJ tolerance decreases to 0, and transmits the data frame to a target station by using the LJ access category when the backoff count decreases to 0. In the foregoing manner, the station can dynamically adjust a tolerance value corresponding to the LJ tolerance and dynamically reduce a backoff value corresponding to the backoff count, thereby increasing the flexibility of the backoff and improving the data transmission efficiency of an LJ service.

Based on FIG. 3, the data transmission method provided in the embodiments of this disclosure may further include:
resetting the LJ tolerance to the first tolerance value and setting the backoff count of the LJ access category from the first backoff value to the second backoff value, when the data frame enters the LJ access category and at least one data frame already exists in the LJ access category.

In this embodiment of this disclosure, another method for resetting the LJ tolerance and the backoff count is described. The LJ tolerance and the backoff count may be set when the following two conditions are both met. One condition is that at least one data frame already exists in a queue of the AC[LJ], and the other condition is that a new data frame needs to enter the queue of the AC[LJ]. In this case, an EDCAF of the AC[LJ] is to be understood as performing an acceleration operation on the queue of the AC[LJ], that is, the backoff count is set from the first backoff value to the second backoff value, which is consistent with the foregoing embodiment, where the second backoff value is less than the first backoff value. Meanwhile, the LJ tolerance of the AC[LJ] needs to be reset to the first tolerance value.

Figure 5:
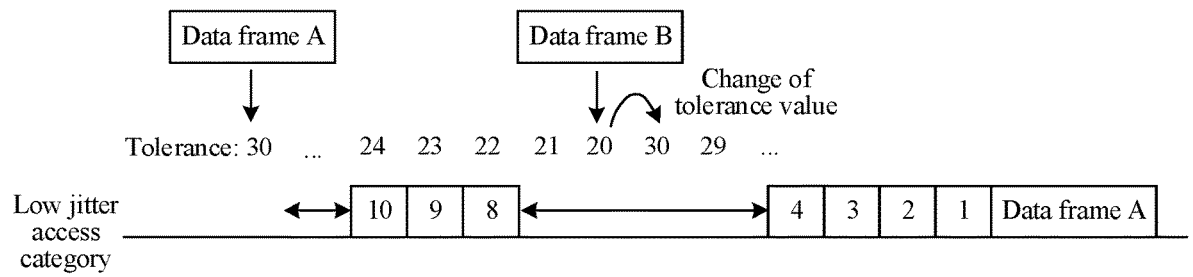
FIG. 5 is a schematic diagram of another data transmission based on an LJ access category according to an embodiment of this disclosure.

For ease of description, FIG. 5 is a schematic diagram of another data transmission based on an LJ access category according to an embodiment of this disclosure. As shown in FIG. 5, it is assumed that a first tolerance value is 30; in a queue of an AC[LJ], when an LJ tolerance is 30, a data frame A enters the queue of the AC[LJ], but a backoff count does not decrease to 0 in this case. Therefore, the station cannot transmit the data frame A by using the AC[LJ] yet. When the LJ tolerance is 20, a data frame B enters the queue of the AC[LC]. In this case, the data frame A already exists in the queue of the AC[LJ], and to ensure that a data frame entering the queue subsequently can be normally stored in the AC[LJ], the LJ tolerance may be reset to 30. When the backoff count reaches 0, the station may transmit the data frame A and the data frame B to a target station in sequence by using the AC[LJ].

In this embodiment of this disclosure, a data transmission method based on an AC[LJ] is further provided. When a data frame enters an LJ access category and at least one data frame already exists in the LJ access category, the station may reset an LJ tolerance to a first tolerance value, and set a backoff count of the LJ access category from a first backoff value to a second backoff value. In the foregoing manner, when at least one data frame exists in the queue of the AC[LJ] and a new data frame enters the queue of the AC[LJ], the LJ tolerance of the AC[LJ] may be reset, to ensure the reasonable application of the AC[LJ] and reduce a count value of the backoff count, thereby implementing acceleration.

The data transmission method provided in the embodiments of this disclosure may further include:
eliminating the LJ access category when entering of X data frames to the LJ access category does not occur within a survival time (or time to live), the survival time representing a survival upper limit of the LJ access category, X being an integer greater than or equal to 1; and
eliminating the LJ access category when a quantity of data frames in the LJ access category is greater than or equal to a maximum frame quantity, the maximum frame quantity representing a quantity upper limit of data frames stored in the LJ access category simultaneously.

In this embodiment of this disclosure, two methods for eliminating an AC[LJ] are described.

In the first manner of eliminating the AC[LJ], if a survival time of an AC[LJ] decreases to 0 and entering of X data frames to a queue of the AC[LJ] does not occur, the AC[LJ] is eliminated. The survival time represents a survival upper limit of the LJ access category, and X may be generally set to 1 or may be set to another integer greater than 1 in an actual application. When a data frame enters the LJ access category so that a quantity of data frames in the LJ access category is equal to X, counting of the survival time is stopped. When a data frame leaves the LJ access category so that the quantity of data frames in the LJ access category is (X−1), the count of the survival time is reset and counting is started. When the count of the survival time is 0, the LJ access category is eliminated.

In an example, when a queue of an AC[LJ] is in an idle state, a count of a survival time of the AC[LJ] is reset to L. When the last data frame leaves the queue of the AC[LJ], it represents that the queue of the AC[LJ] starts to be idle currently. Similar to the manner of calculating the backoff count and the counting manner of the LJ tolerance, the counting manner of the survival time is also in the unit of slot (aSlotTime), that is, the count of the survival time is decreased by 1 after each slot. When a data frame enters the queue of the AC[LJ], counting of the survival time is stopped.

Assuming that an initial value L of the survival time is 100, when the survival time decreases to 73, the first data frame enters the queue of the AC[LJ]. In this case, counting of the survival time is stopped, that is, the survival time stays at 73, until the last data frame leaves the queue of the AC[LJ]. Then, the survival time may be reset to the initial value 100.

In the second manner of eliminating the AC[LJ], if a quantity of data frames in the queue of the AC[LJ] is greater than or equal to a maximum frame quantity supported by the AC[LJ], the AC[LJ] is eliminated. The maximum frame quantity represents a quantity upper limit of data frames stored in the LJ access category simultaneously.

In an example, when a data frame enters a queue of an AC[LJ], a count of the quantity of LJ frames in the AC[LJ] is increased by 1, and when a data frame leaves the queue of the AV[LJ], the count of the quantity of LJ frames in the AC[LJ] is decreased by 1. Assuming that the maximum frame quantity of the AC[LJ] is N, when the quantity of data frames in the queue of the AC[LJ] is equal to N, the EDCAF needs to immediately eliminate the AC[LJ] and clear all content in the queue of the AC[LJ]. In addition, data frames in the queue of the AC[LJ] further need to be processed in a manner of retransmission failure and a medium access control (MAC) layer and an upper layer are notified. For example, the data frame may be transmitted again after an interval of time, or the data frame may be transmitted to a target station by using another AC, or it is determined that the data frame is no longer transmitted. The station transmits a notification of data transmission failure to the target station by using an LJ service request frame or an LJ service response frame. For example, content such as a corresponding operation type field (for example, a field of destruction of the AC[LJ]) and an identifier (LJ-ID) of the AC[LJ] is carried in the LJ service request frame or the LJ service response frame.

It may be understood that the station or the upper layer that requests to create the AC[LJ] may also initiate a destruction request. The upper layer may be a layer above the MAC layer and a PHY layer, for example, an application layer, a remote procedure call (RPC) layer, an Internet Protocol address (IP address) layer, a transmission control protocol (TCP) layer, or a user datagram protocol (UDP) layer. This is not limited herein.

After the AC[LJ] is eliminated, the station or the upper layer for service needs to be notified by using the LJ service request frame or the LJ service response frame. If the destruction fails, the station or the upper layer for service also needs to be notified by using the LJ service request frame or the LJ service response frame, and a reason for the destruction failure is carried in the notification, for example, the station cannot find an L-ID requested to be eliminated.

The maximum frame quantity of the AC[LJ] is set, so that a frequency of accelerated contention of the AC[LJ] for a TXOP may be constrained and a priority of the AC[LJ] can be ensured. This is because when the AC[LJ] has a higher capability of contending for the TXOP than another AC and a length of a data frame for service is relatively short each time, a large quantity of data frames may be overstocked. Once the data frames are overstocked, it is considered that a current network has frequent collisions or other situations such as excessively low signal strength, malicious packet attack, service requirements far beyond a service capability of the AC[LJ] for acceleration in priority, or the like. Once the cases happen, the AC[LJ] needs to be eliminated immediately and a notification of a reason is transmitted.

Again, in this embodiment of this disclosure, a manner of eliminating the AC[LJ] is provided. In one manner, the LJ access category is eliminated when no data frame enters the LJ access category within a survival time, the survival time representing a survival upper limit of the LJ access category. In another manner, the LJ access category is eliminated when a quantity of data frames in the LJ access category is greater than or equal to a maximum frame quantity, the maximum frame quantity representing a quantity upper limit of data frames stored in the LJ access category simultaneously. In the foregoing manner, a frequency of accelerated contention of the AC[LJ] for the TXOP can be effectively constrained, so that the AC[LJ] does not occupy airtime excessively frequently and a priority effect of the AC[LJ] can also be ensured. A rapid contention capability of the AC[LJ] for the TXOP only further exacerbates collisions in the case of frequent collisions in the network or in other severe cases, until the network is paralyzed. Therefore, the AC[LJ] may be eliminated in time, to help reduce collisions. When a service requires a large quantity of frames to contend for a TXOP within a short time, collisions are also increased dramatically, especially contention between ACs [LJ] of a plurality of stations under the same Wi-Fi network. Therefore, eliminating the AC[LJ] in this case can allow the upper layer and the target station to know the Wi-Fi network condition in time, to avoid the aggravation of collisions, so that the priority effect of the AC[LJ] on the LJ service is more obvious and more flexible.

Based on FIG. 3, in the data transmission method provided in the embodiments of this disclosure, before the setting an LJ tolerance of the LJ access category to a first tolerance value, the method may further include:

transmitting an LJ service request frame to the target station; receiving an LJ service response frame transmitted by the target station; and finally creating the LJ access category according to the LJ service response frame.

Figure 6:
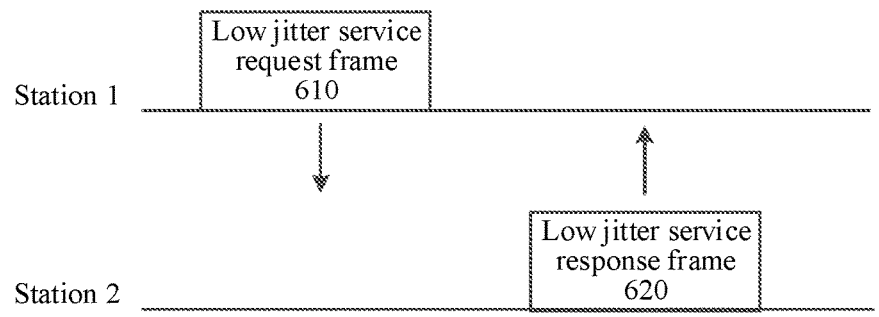
FIG. 6 is a schematic diagram illustrating a process of creating an LJ access category according to an embodiment of this disclosure.

In this embodiment of this disclosure, a manner of creating the AC[LJ] is described. A station providing an LJ service is a target station, and a station requesting the LJ service is a source station 310. For ease of description, FIG. 6 is a schematic diagram of an embodiment of creating an LJ access category according to an embodiment of this disclosure. As shown in FIG. 6, a station 1 may initiate creation of an AC[LJ]. First, the station 1 transmits an LJ service request frame 610 to a station 2 to request the station 2 to create the AC[LJ], the AC[LJ] being used for preferentially serving LJ service data transmitted by the station 2 to the station 1. After receiving the LJ service request frame 610, the station 2 needs to feed back an LJ service response frame 620 to the station 1. Therefore, the station 1 determines, according to the LJ service response frame 620, whether the AC[LJ] is created currently, that is, an operation type field such as a field of "creation succeeds" or a field of "creation fails" may be carried in the LJ service response frame 620.

The station 1 is the source station and the station 2 is the target station. The station 1 in FIG. 6 may be an AP and the station 2 may be a non-AP STA associated with the AP, or the station 2 in FIG. 6 may be an AP and the station 1 may be a non-AP STA associated with the AP. This is not limited herein.

In this embodiment of this disclosure, a method for creating the AC[LJ] is provided. Before an LJ tolerance of an LJ access category is set to a first tolerance value, the source station may further transmit an LJ service request frame to the target station; the source station then receives an LJ service response frame transmitted by the target station; and finally the source station creates the LJ access category according to the LJ service response frame. In the foregoing manner, the target station may create the AC[LJ] according to a request frame transmitted by the source station, so that a feasible manner of creating the AC[LJ] is provided.

Based on FIG. 3, in the data transmission method provided in the embodiments of this disclosure, before the setting an LJ tolerance of the LJ access category to a first tolerance value, the method may further include:

obtaining a creation request; creating the LJ access category according to the creation request; and transmitting an LJ service response frame to the target station.

Figure 7:
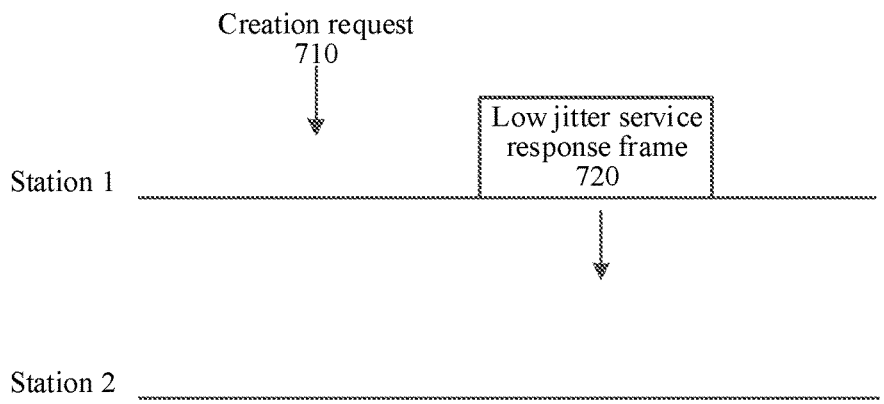
FIG. 7 is a schematic diagram illustrating a process of creating an LJ access category according to an embodiment of this disclosure.

In this embodiment of this disclosure, another manner of creating the AC[LJ] is described. A station providing an LJ service is a target station, and a station requesting the LJ service is a source station. For ease of description, FIG. 7 is a schematic diagram of an embodiment of creating an LJ access category according to an embodiment of this disclosure. As shown in FIG. 7, a station 1 may initiate creation of an AC[LJ]. First, the station 1 obtains an AC[LJ] creation request 710 delivered by an upper layer, the AC[LJ] being used for differentiating LJ service data provided by a station 2. After the station 1 creates the AC[LJ], the station 1 needs to transmit an LJ service response frame 720 to the station 2, to notify the station 2 that the AC[LJ] has been created.

The upper layer may determine, according to a service currently used by a user, whether to deliver the creation request. For example, when it is detected that the current service is a service of an LJ type, the upper layer may deliver the AC[LJ] creation request.

The station 1 in FIG. 7 may be an AP and the station 2 may be a non-AP STA associated with the AP, or the station 2 in FIG. 7 may be an AP and the station 1 may be a non-AP STA associated with the AP. This is not limited herein.

In this embodiment of this disclosure, a method for creating the AC[LJ] is provided. Before an LJ tolerance of an LJ access category is set to a first tolerance value, the source station obtains a creation request from the upper layer, creates the LJ access category according to the creation request, and finally transmits an LJ service response frame to the target station. In the foregoing manner, the source station may create the AC[LJ] according to a request from the upper layer, so that another feasible manner of creating the AC[LJ] is provided, thereby improving the flexibility and the feasibility of the solution.

Based on FIG. 3, in the data transmission method provided in the embodiments of this disclosure, before the setting an LJ tolerance of the LJ access category to a first tolerance value, the method may further include:

generating a creation request according to information about the source station; creating the LJ access category according to the creation request; and transmitting an LJ service response frame to the target station.

Figure 8:
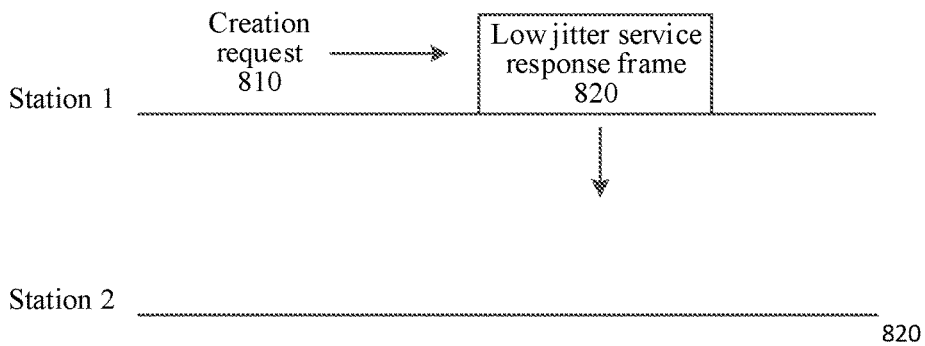
FIG. 8 is a schematic diagram illustrating a process of creating an LJ access category according to an embodiment of this disclosure.

In this embodiment of this disclosure, another manner of creating the AC[LJ] is described. A station providing an LJ service is a target station, and a station requesting the LJ service is a source station. For ease of description, FIG. 8 is a schematic diagram of an embodiment of creating an LJ access category according to an embodiment of this disclosure. As shown in FIG. 8, a station 1 may determine, based on local information, whether an AC[LJ] needs to be actively created, the AC[LJ] being used for differentiating LJ service data provided by a station 2. After the station 1 creates the AC[LJ], the station 1 needs to transmit an LJ service response frame 820 to the station 2, to notify the station 2 that the AC[LJ] has been created.

The local information may include a network throughput. If a network condition is relatively poor, an AC[LJ] creation request may be actively triggered. The local information may alternatively refer to detecting a transmitting frequency of data frames. If the data frames are continuously transmitted in a period of time, it is considered that the service may be an LJ service. Therefore, the AC[LJ] creation request may be actively triggered.

The station 1 in FIG. 8 may be an AP and the station 2 may be a non-AP STA associated with the AP, or the station 2 in FIG. 8 may be an AP and the station 1 may be a non-AP STA associated with the AP. This is not limited herein.

In this embodiment of this disclosure, a method for creating the AC[LJ] is provided. Before an LJ tolerance of an LJ access category is set to a first tolerance value, the source station generates a creation request according to information about the source station, creates the LJ access category according to the creation request, and finally transmits an LJ service response frame to the target station. In the foregoing manner, the source station may create the AC[LJ] according to the information about the source station, so that another feasible manner of creating the AC[LJ] is provided, thereby improving the flexibility and the feasibility of the solution.

Base on FIG. 3, in the data transmission method provided in the embodiments of this application, the LJ service request frame or the LJ service response frame includes an LJ control parameter set, the LJ control parameter set including at least one of an identifier of the LJ access category, an address of the source station, an address of the target station, an address of a station supporting the LJ access category, an operation type, reason code, and a service priority field.

The LJ service request frame or the LJ service response frame includes an LJ parameter set, the LJ parameter set including at least one of the LJ tolerance, a survival time, a maximum frame length, and a maximum frame quantity, the survival time representing a survival upper limit of the LJ access category, the maximum frame length representing a data frame length upper limit supported by the LJ access category, the maximum frame quantity representing a quantity upper limit of data frames that the LJ access category is capable of storing simultaneously.

In this embodiment of this disclosure, an LJ control parameter set and an LJ parameter set are defined. The LJ control parameter set and the LJ parameter set may be carried in an LJ service request frame or an LJ service response frame. The LJ service request frame and the LJ service response frame may use the same frame format, or may use two different frame formats. The LJ service request frame and the LJ service response frame may reuse a defined MAC frame structure such as a MAC control frame, or may use a newly defined frame format, and may be elements included in the MAC frame.

The following describes the LJ control parameter set and the LJ parameter set separately. The LJ service request frame and the LJ service response frame include, but are not limited to, the following LJ control parameter set:

(1) an identifier of the LJ access category, that is, an identifier (LJ-ID) of the AC[LJ], different LJ-IDs being used for indicating different ACs[LJ];

(2) an address of the source station, representing an address of a station initiating a request;

(3) an address of the target station, representing an address of a station providing a service;

(4) an address of a station supporting the LJ access category, representing an address of a station having the AC[LJ];

(5) an operation type, representing currently requested content, including, for example, "request creation", "confirm creation", "creation failure", "request destruction", "confirm destruction", "destruction failure", and "capability broadcast", and the operation type being typically carried by the LJ service request frame;

(6) reason code, used for describing a reason for the request or a reason for the failure of the request, the reason code being typically carried by the LJ service response frame; and (7) a service priority field, used for describing a priority of the AC[LJ], and using a traffic identification (TID) defined by the IEEE 802.11 or using a newly defined field.

The LJ service request frame and the LJ service response frame include, but not limited to, the following LJ parameter set:

(1) an LJ tolerance T, used for describing a degree to which the AC[LJ] tolerates a transmission latency, which may be rounded up/down by following the setting of the backoff count and is in the unit of aSlotTime;

(2) a survival time L, used for describing a longest time-to-live of the AC[LJ], where if a time for which a queue of the AC[LJ] is in an empty state exceeds the survival time, an AC[LJ] owner can be triggered to eliminate the AC[LJ] and stop differentiating a priority of an LJ service;

(3) a maximum frame length M, used for describing a maximum frame length supported by the AC[LJ], that is, a maximum length of a data frame (for example, an MSDU) that can enter the queue of the AC[LJ]; and (4) a maximum frame quantity N, used for describing a maximum quantity of data frames that can be stored in the queue of the AC[LJ] simultaneously, that is, a quantity of MSDUs.

When receiving the AC[LJ] creation request transmitted by the source station, the target station may determine, according to whether a capability of the target station matches the LJ parameter set, whether to create the AC[LJ]. If the target station cannot create the AC[LJ] according to parameter values of the request, the target station may indicate, in the LJ service response frame, a supported or recommended LJ parameter set, and feedback the supported or recommended LJ parameter set to the source station. After receiving the LJ service response frame, the source station may reset the LJ parameter set and initiate the AC[LJ] creation request again.

In some embodiments, it is defined that the LJ service request frame or the LJ service response frame may include an LJ control parameter set and an LJ parameter set, the LJ control parameter set including at least one of an identifier of the LJ access category, an address of the source station, an address of the target station, an address of a station supporting the LJ access category, an operation type, reason code, and a service priority field, the LJ parameter set including at least one of an LJ tolerance, a survival time, a maximum frame length, and a maximum frame quantity. A new mechanism is defined by using the parameters, to differentiate service priorities; a priority higher than that of an existing AC can be obtained by using the parameters, that is, a TXOP can be obtained in contention more quickly and more possibly for the LJ service.

Based on FIG. 3, in the data transmission method provided in the embodiments of this disclosure, the LJ service request frame or the LJ service response frame further includes enhanced distributed channel access (EDCA) parameters, the EDCA parameters including a minimum CA value, a maximum CA value, a TXOP limit, and an AIFS.

In this embodiment of this disclosure, a group of EDCA parameters suitable for a Wi-Fi scenario are defined. The EDCA parameters may be carried in the LJ service request frame or the LJ service response frame and include a minimum CA value, a maximum CA value (CWmax), a TXOP limit, and an (AIFS.

In an example, an opportunity to access a channel may be obtained by using the EDCA parameters. CWmin represents a minimum CW, and a smaller CWmin indicates a higher priority. CWmax represents a maximum CW, and a smaller CWmax indicates a higher priority. The TXOP limit represents a longest occupation time of a channel. The AIFS represents a channel idle time that needs to be waited for obtaining a TXOP.

$$AIFS(AC[LJ])=AIFSN(AC[LJ]) \times aSlotTime \times aSIFSTime;$$

where AIFS(AC[LJ]) represents an arbitration inter-frame spacing number (AIFSN) based on the AC[LJ], and aSIFSTime represents a short inter-frame space (SIFS) time.

It may be understood that the setting of the EDCA parameters needs to follow an IEEE 802.11 mechanism. The EDCA parameters need to be set to default values when not explicitly specified. The default value is set to cause the AC[LJ] to have a priority as high as possible. To ensure fairness, a default value of the TXOP limit of the AC[LJ] may be set as small as possible, to prevent priority abuse from affecting the fairness. An example of the default values of the EDCA parameters based on the AC[LJ] is as follows: CWmin=3, CWmax=7, AIFSN=2, and TXOP limit=0.5 milliseconds (ms). During actual application, the EDCA parameters may be alternatively adjusted as required.

In this embodiment of this disclosure, the EDCA parameters that may be included in the LJ service request frame or the LJ service response frame are defined, that is, the EDCA parameters include a minimum CW value, a maximum CW value, a TXOP limit, and an AIFS. These parameters are applicable to a Wi-Fi environment under the current 802.11 protocol, thereby ensuring the applicability and the feasibility of the solution.

Based on FIG. 3, in the data transmission method provided in the embodiments of this disclosure, before the setting, when a data frame enters an LJ access category, an LJ tolerance of the LJ access category to a first tolerance value, the method may further include:

receiving a data frame, and determining, when the data frame meets a data transmission condition, that the data frame enters the LJ access category; and determining, when the data frame does not meet the data transmission condition, that the data frame enters a conventional access category, the conventional access category including at least one of a voice (VO) access category, a video (VI) access category, a best effort (BE) access category, and a background (BK) access category.

In this embodiment of this disclosure, a data frame filtering method based on an AC[LJ] operation is described. The station needs to first receive a data frame, determine information corresponding to the data frame, and determine, if it is determined that the data frame meets a data transmission condition, that the data frame may enter the queue of the AC[LJ] for an acceleration operation. Conversely, if it is determined that the data frame does not meet the data transmission condition, it is determined that the data frame may enter a queue of a conventional AC for transmission.

Figure 9:
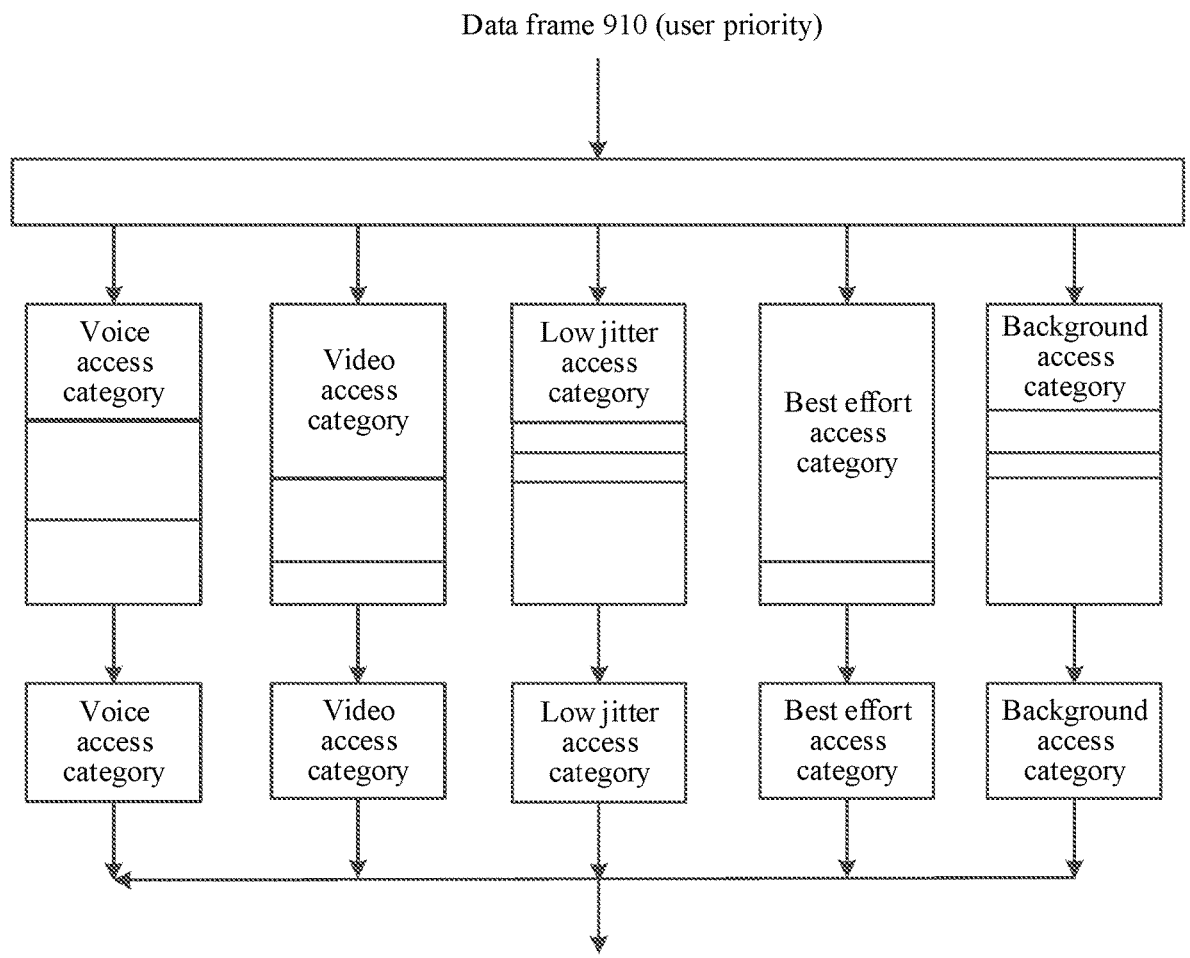
FIG. 9 is a schematic diagram illustrating a data frame entering an LJ access category according to an embodiment of this disclosure.

For ease of description, FIG. 9 is a schematic diagram of an embodiment of a data frame 910 entering an LJ access category according to an embodiment of this disclosure. As shown in FIG. 9, after an AC[LJ] is created, the station filters, according to a configured LJ parameter set, a data frame 910 delivered by an upper layer to a MAC layer, and the data frame 910 is mapped to a corresponding AC by using the EDCA according to a user priority field of the upper layer. A data frame (for example, an MSDU) that meets the data transmission condition enters a queue of the AC[LJ]. A data frame (for example, an MSDU) that does not meet the data transmission condition needs to enter a conventional AC according to an EDCA rule of an existing IEEE 802.11 protocol.

It may be understood that the data transmission condition may include at least one condition. For example, it is considered that a data frame meets the data transmission condition only when the data frame (for example, an MSDU) transmitted to the source station reaches the MAC layer of the target station, and a length of the data frame (for example, the MSDU) is less than the maximum frame length M. Alternatively, only one data frame can enter the AC[LJ] per unit time (for example, 10 slots). The maximum frame length is set to constrain a length of a data frame that is accelerated each time by using the AC[LJ], to avoid occupying excessive airtime. Such a setting may be used in cooperation with the TXOP limit. By using a mobile game service as an example, the maximum frame length may be set to hundreds of bytes.

Figures 10, 11:
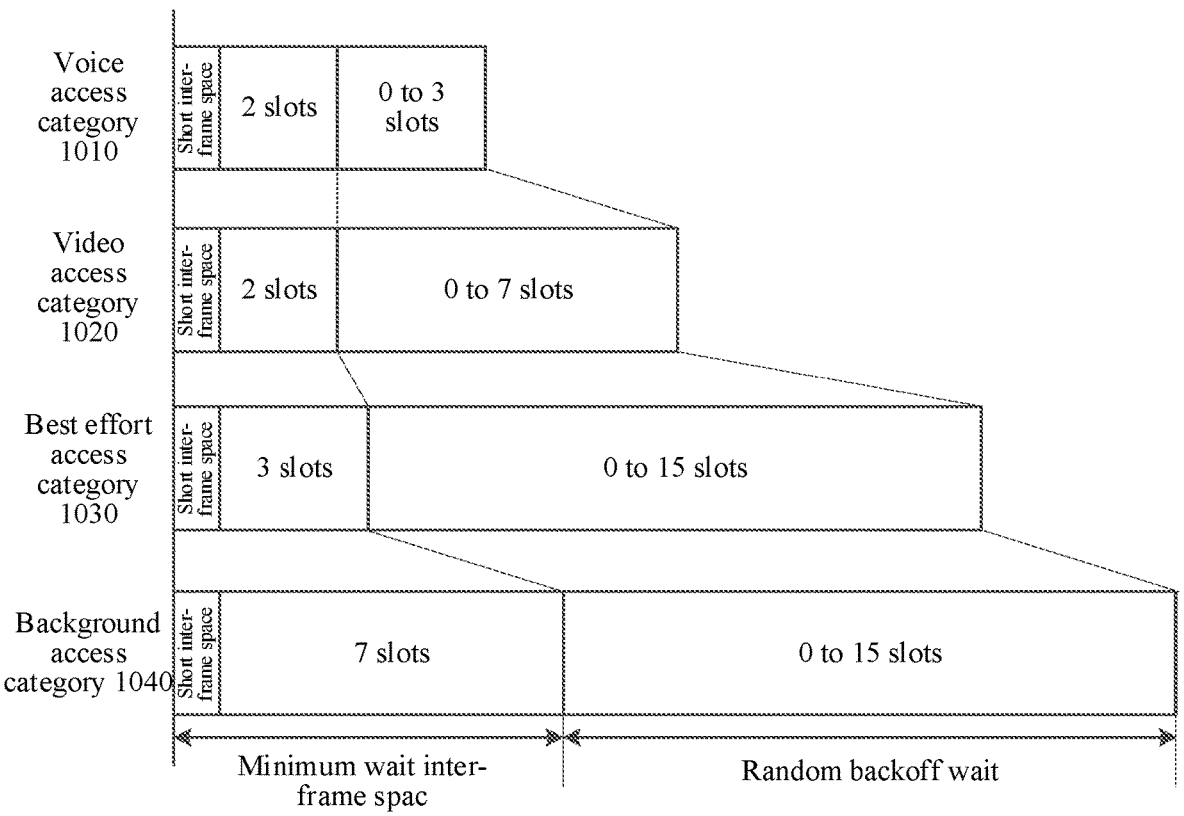
FIG. 10 is a schematic diagram of an inter-frame space of a conventional access category according to an embodiment of this disclosure.
FIG. 11 is a schematic diagram illustrating another method for creating an access category according to an embodiment of this disclosure.

The conventional AC includes a voice (VO) AC, a video (VI) AC, a best effort (BE) AC, and a background (BK) AC. FIG. 10 is a schematic diagram of any inter-frame space of a conventional access category according to an embodiment of this disclosure. As shown in FIG. 10, priorities of different ACs are reflected by setting different EDCA parameters. In the 802.11 protocol, idle wait duration (that is, distributed inter-frame spacing, DIFS for short) is a fixed value, different idle wait duration may be configured for different ACs, and a larger AIFSN value indicates a longer idle wait time of a user. For the VO_AC 1010, the AIFSN may be set to 2 slots, and a random backoff wait time is 0 to 3 slots. For the VI_AC 1020, the AIFSN may be set to 2 slots, and the random backoff wait time is 0 to 7 slots. For the BE_AC 1030, the AIFSN may be set to 3 slots, and the random backoff wait time is 0 to 15 slots. For the BK_AC 1040, the AIFSN may be set to 7 slots, and the random backoff wait time is 0 to 15 slots.

To ensure different quality of service (QoS) requirements of different services, eight traffic categories (TCs) of the upper layer based on IEEE 802.1D and four ACs of this layer are defined in the EDCA, and the eight TCs are respectively mapped to queues of the four ACs, that is, four different ACs are defined in each channel. The AC may be expressed as AC[0]-AC[3] with ascending priorities, and each AC has an independent transmit queue. The purpose of differentiating priorities is achieved by allocating different contention parameters to each AC.

Based on FIG. 10 and the description of the AC[LJ], EDCA parameters of several types of ACs are compared below. Referring to Table 1, Table 1 is schematic content of EDCA parameters corresponding to ACs in this embodiment of this disclosure.

TABLE 1

| AC type | CWmin | CWmax | AIFSN | TXOP limit |
|---|---|---|---|---|
| AC[LJ] | 3 | 7 | 2 | 0.5 ms |
| AC_BK | 31 | 1023 | 7 | 0 ms |
| AC_BE | 31 | 1023 | 3 | 0 ms |
| AC_VI | 15 | 31 | 2 | 3.008 ms |
| AC_VO | 7 | 15 | 2 | 1.504 ms |
| Legacy AC | 15 | 1023 | 2 | 0 ms |

As can be learned, the AC[LJ] has a smaller TXOP limit, smaller CWmin, and smaller CWmax.

In this embodiment of this disclosure, a data frame filtering method based on an AC[LJ] operation is provided. Before an LJ tolerance of an LJ access category is set to a first tolerance value, the station may further receive a data frame; determine, when the data frame meets a data transmission condition, that the data frame enters the LJ access category; and determine, when the data frame does not meet the data transmission condition, that the data frame enters a conventional access category, the conventional access category including at least one of a VO access category, a VI access category, a BE access category, and a BK access category. In the foregoing manner, the acceleration operation is performed only on the data frame meeting the data transmission condition, rather than on any type of data frame. Therefore, the use of the AC[LJ] is constrained by fully considering the fairness principle, thereby avoiding abuse of a priority mechanism.

A method for creating an AC[LJ] according to the embodiments of this disclosure is described below with reference to the foregoing descriptions. Referring to FIG. 11, the method for creating an access category in the embodiments of this disclosure includes the following steps.

S201. Obtain an LJ associated parameter set, the LJ associated parameter set being used for indicating a data transmission condition supported by an LJ access category, the data transmission condition being a condition that is met for transmitting LJ service data.

In this embodiment of this disclosure, a method for creating an AC[LJ] is described. A station obtains an LJ associated parameter set, the LJ associated parameter set including an LJ control parameter set and an LJ parameter set. It may be understood that the station may be a source station or may be a target station.

S202. Create the LJ access category according to the LJ associated parameter set.

In this embodiment of this disclosure, the station creates an LJ access category according to the LJ associated parameter set. In an example, when the station is the source station, the AC[LJ] may be created in the following manner. First, the source station may initiate creation of the AC[LJ], and the source station transmits an LJ service request frame to the target station to request the target station to create the AC[LJ], the AC[LJ] being used for preferentially serving LJ service data transmitted by the target station to the source station. After receiving the LJ service request frame, the target station needs to feed back an LJ service response frame to the source station. Therefore, the source station determines, according to the LJ service response frame, whether the AC[LJ] is created currently, that is, an operation type field such as a field of "creation succeeds" or a field of "creation fails" may be carried in the LJ service response frame.

In some embodiments, the source station may autonomously initiate the creation of the AC[LJ]. First, the source station obtains an AC[LJ] creation request delivered by an upper layer, the AC[LJ] being used for distinguishing LJ service data provided by the target station. After the source station creates the AC[LJ], the source station needs to transmit an LJ service response frame to the target station, to notify the target station that the AC[LJ] has been created. The upper layer may determine, according to a service currently used by a user, whether to deliver the creation request. For example, when it is detected that the current service is a service of an LJ type, the upper layer may deliver the AC[LJ] creation request.

In some embodiments, the source station may autonomously initiate the creation of the AC[LJ]. The source station may determine, based on local information, whether the AC[LJ] needs to be actively created, the AC[LJ] being used for differentiating LJ service data provided by the target station. After the source station creates the AC[LJ], the source station needs to transmit an LJ service response frame to the target station, to notify the target station that the AC[LJ] has been created. The local information may include a network throughput. If a network condition is relatively poor, an AC[LJ] creation request may be actively triggered. The local information may alternatively refer to detecting a transmitting frequency of data frames. If the data frames are continuously transmitted in a period of time, it is considered that the service may be an LJ service. Therefore, the AC[LJ] creation request may be actively triggered.

In this embodiment of this disclosure, a method for creating an AC[LJ] is provided. The station may obtain an LJ associated parameter set, the LJ associated parameter set being used for indicating a data transmission condition supported by an LJ access category, the data transmission condition being a condition that is met for transmitting LJ service data, and then the station creates an LJ access category according to the LJ associated parameter set. In the foregoing manner, a feasible manner of creating the AC[LJ] is provided, thereby improving the feasibility and the operability of the solution.

Based on FIG. 11, in the method for creating an access category provided in the embodiments of this disclosure, the LJ associated parameter set includes an LJ control parameter set and an LJ parameter set.

The LJ control parameter set includes at least one of an identifier of the LJ access category, an address of a source station, an address of a target station, an address of a station supporting the LJ access category, an operation type, reason code, and a service priority field.

The LJ parameter set includes at least one of an LJ tolerance, a survival time, a maximum frame length, and a maximum frame quantity, the survival time representing a survival upper limit of the LJ access category, the maximum frame length representing a data frame length upper limit supported by the LJ access category, the maximum frame quantity representing a quantity upper limit of data frames that the LJ access category is capable of storing simultaneously.

In this embodiment of this disclosure, an LJ control parameter set and an LJ parameter set are defined. The LJ control parameter set and the LJ parameter set may be carried in an LJ service request frame or an LJ service response frame, and the LJ service request frame and the LJ service response frame may use the same frame format, or may use two different frame formats. The LJ service request frame and the LJ service response frame may reuse a defined MAC frame structure such as a MAC control frame, or may use a newly defined frame format, and may be elements included in the MAC frame.

The LJ service request frame and the LJ service response frame include, but not limited to, the following LJ control parameter set: an identifier of the LJ access category, an address of a source station, an address of a target station, an address of a station supporting the LJ access category, an operation type, reason code, and a service priority field. It may be understood that for definitions in the LJ control parameter set, reference may be made to the foregoing embodiments. This is not limited herein.

The LJ service request frame and the LJ service response frame include, but not limited to, the following LJ parameter set: an LJ tolerance, a survival time, a maximum frame length, and a maximum frame quantity N. It may be understood that for definitions in the U parameter set, reference may be made to the foregoing embodiments. This is not limited herein.

In this embodiment of this disclosure, it is defined that the LJ service request frame or the LJ service response frame may include an LJ control parameter set and an LJ parameter set, the LJ control parameter set including at least one of an identifier of the LJ access category, an address of the source station, an address of the target station, an address of a station supporting the LJ access category, an operation type, reason code, and a service priority field, the LJ parameter set including at least one of the LJ tolerance, a survival time, a maximum frame length, and a maximum frame quantity. A new mechanism is defined by using the parameters, to differentiate service priorities; a priority higher than that of an existing AC can be obtained by using the parameters, that is, a TXOP can be obtained in contention more quickly and more possibly for the LJ service.

Based on FIG. 11, in the method for creating an access category provided in the embodiments of this disclosure, the LJ associated parameter set further includes EDCA parameters, the EDCA parameters including a minimum CA value, a maximum CA value, a TXOP limit, and an AIFS.

In this embodiment of this disclosure, a group of EDCA parameters suitable for a Wi-Fi scenario are defined. The EDCA parameters may be carried in the LJ service request frame or the LJ service response frame and include CWmin, CWmax, a TXOP limit, and an AIFS.

In an example, an opportunity to access a channel may be obtained by using the EDCA parameters. CWmin represents a minimum CW, and a smaller CWmin indicates a higher priority. CWmax represents a maximum CW, and a smaller CWmax indicates a higher priority. The TXOP limit represents a longest occupation time of a channel. The AIFS represents a channel idle time that needs to be waited for obtaining a TXOP.

$$\text{AIFS}(AC[LJ])=\text{AIFSN}(AC[LJ])\times\text{aSlotTime}\times\text{aSIFS-Time};$$

where AIFSN(AC[LJ]) represents an AIFSN based on an AC[LJ], and aSIFSTime represents an SIFS time.

It may be understood that the setting of the EDCA parameters needs to follow an IEEE 802.11 mechanism. The EDCA parameters need to be set to default values when not explicitly specified. The default value is set to cause the AC[LJ] to have a priority as high as possible. To ensure fairness, a default value of the TXOP limit of the AC[LJ] may be set as small as possible, to prevent priority abuse from affecting fairness. An example of the default values of the EDCA parameters based on the AC[LJ] is as follows: CWmin=3, CWmax=7, AIFSN=2, and TXOP limit=0.5 milliseconds (ms). During actual application, the EDCA parameters may be alternatively adjusted as required.

In this embodiment of this disclosure, the EDCA parameters that may be included in the LJ service request frame or the LJ service response frame are provided, that is, the EDCA parameters include CWmin, CWmax, a TXOP limit, and an AIFS. These parameters are applicable to a Wi-Fi environment under the current 802.11 protocol, thereby ensuring the applicability and the feasibility of the solution.

Figure 12:
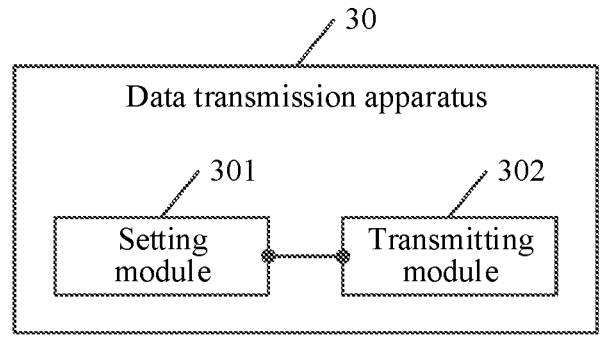
FIG. 12 is a schematic diagram of a composition structure of a data transmission apparatus according to an embodiment of this disclosure.

A data transmission apparatus in the embodiments of this disclosure is described below in detail. FIG. 12 is a schematic diagram of a composition structure of a data transmission apparatus according to an embodiment of this disclosure. As shown in FIG. 12, the data transmission apparatus 30 includes:

a setting module 301, configured to set, when a data frame enters an LJ access category, an LJ tolerance of the LJ access category to a first tolerance value, the LJ tolerance representing a transmission latency upper limit of the LJ access category, the setting module 301 being further configured to set the LJ tolerance to a second tolerance value and set a backoff count of the LJ access category from a first backoff value to a second backoff value, when the LJ tolerance decreases to 0, the second tolerance value being less than or equal to the first tolerance value, the second backoff value being less than the first backoff value, the first backoff value being a backoff value corresponding to a case that the LJ tolerance decreases to 0; and a transmitting module 302, configured to transmit the data frame to a target station by using the LJ access category when the backoff count decreases to 0.

In this embodiment of this disclosure, the setting module 301 sets, when a data frame enters an LJ access category, an LJ tolerance of the LJ access category to a first tolerance value, the LJ tolerance representing a transmission latency upper limit of the LJ access category; the setting module 301 sets the LJ tolerance to a second tolerance value and sets a backoff count of the LJ access category from a first backoff value to a second backoff value when the LJ tolerance decreases to 0, the second tolerance value being less than or equal to the first tolerance value, the second backoff value being less than the first backoff value, the first backoff value being a backoff value corresponding to a case that the LJ tolerance decreases to 0; the transmitting module 302 transmits the data frame to a target station by using the LJ access category when the backoff count decreases to 0.

In the embodiments of this disclosure, a data transmission apparatus is provided. A station sets, when a data frame enters an LJ access category, an LJ tolerance of the LJ access category to a first tolerance value, the LJ tolerance representing a transmission latency upper limit of the LJ access category, sets the LJ tolerance to a second tolerance value and sets a backoff count of the LJ access category from a first backoff value to a second backoff value when the LJ tolerance decreases to 0, the second tolerance value being less than or equal to the first tolerance value, the second backoff value being less than the first backoff value, the first backoff value being a backoff value corresponding to a case that the LJ tolerance decreases to 0, and transmits the data frame to a target station by using the LJ access category when the backoff count decreases to 0. In the foregoing manner, the station can dynamically adjust a tolerance value corresponding to the LJ tolerance and dynamically reduce a backoff value corresponding to the backoff count, thereby increasing the flexibility of the backoff and improving the data transmission efficiency of an LJ service.

Based on FIG. 12, in the data transmission apparatus 30 provided in the embodiments of this disclosure, the setting module 301 is further configured to reset the LJ tolerance to the first tolerance value and set the backoff count from the first backoff value to the second backoff value when the data frame enters the LJ access category and at least one data frame already exists in the LJ access category.

In this embodiment of this disclosure, a data transmission method based on an AC[LJ] is further provided. When a data frame enters an LJ access category and at least one data frame already exists in the LJ access category, the station may reset an LJ tolerance to a first tolerance value, and set a backoff count of the LJ access category from a first backoff value to a second backoff value. In the foregoing manner, when at least one data frame exists in the queue of the AC[LJ] and a new data frame enters the queue of the AC[LJ], the LJ tolerance of the AC[LJ] may be reset, to ensure the reasonable application of the AC[LJ] and reduce a count value of the backoff count, thereby implementing acceleration.

Figure 13:
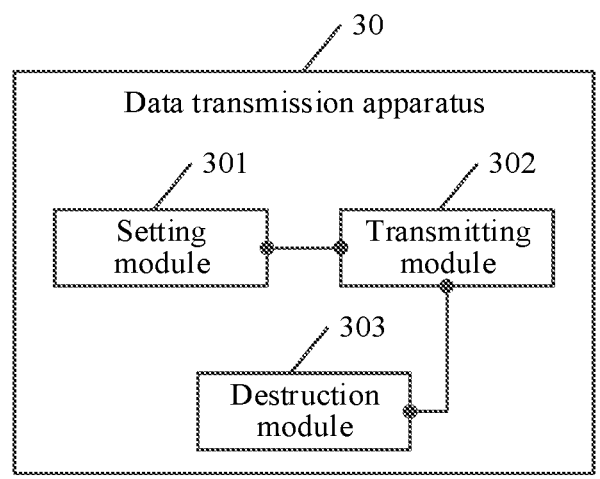
FIG. 13 is a schematic diagram of another composition structure of a data transmission apparatus according to an embodiment of this disclosure.

Based on FIG. 12, FIG. 13 is a schematic diagram of another composition structure of a data transmission apparatus according to an embodiment of this disclosure. As shown in FIG. 13, the data transmission apparatus 30 further includes a destruction module 303.

The destruction module 303 is configured to eliminate the LJ access category when entering of X data frames to the LJ access category does not occur within a survival time, the survival time representing a survival upper limit of the LJ access category, X being an integer greater than or equal to 1; and eliminate the LJ access category when a quantity of data frames in the LJ access category is greater than or equal to a maximum frame quantity, the maximum frame quantity representing a quantity upper limit of data frames stored in the LJ access category simultaneously.

Again, in this embodiment of this disclosure, a manner of eliminating the AC[LJ] is provided. In one manner, the LJ access category is eliminated when no data frame enters the LJ access category within a survival time, the survival time representing a survival upper limit of the LJ access category. In another manner, the LJ access category is eliminated when a quantity of data frames in the LJ access category is greater than or equal to a maximum frame quantity, the maximum frame quantity representing a quantity upper limit of data frames stored in the LJ access category simultaneously. In the foregoing manner, a frequency of accelerated contention of the AC[LJ] for the TXOP can be effectively constrained, so that the AC[LJ] does not occupy airtime excessively frequently and a priority effect of the AC[LJ] can also be ensured. A rapid contention of the AC[LJ] for the TXOP only further exacerbates collisions in the case of frequent collisions in the network or in other severe cases, until the network is paralyzed. Therefore, the AC[LJ] may be eliminated in time, to help reduce collisions. When a service requires a large quantity of frames to contend for a TXOP within a short time, collisions are also increased dramatically, especially contention between ACs[LJ] of a plurality of stations under the same Wi-Fi network. Therefore, eliminating the AC[LJ] in this case can allow the upper layer and the target station to know the Wi-Fi network condition in time, to avoid the aggravation of collisions, so that the priority effect of the AC[LJ] on the LJ service is more obvious and more flexible.

Figure 14:
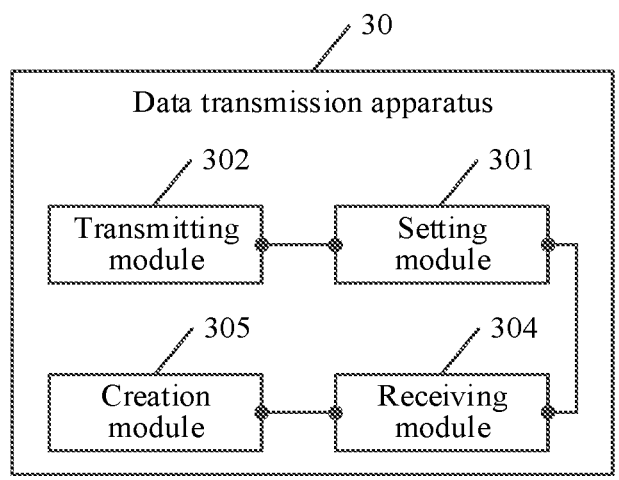
FIG. 14 is a schematic diagram of still another composition structure of a data transmission apparatus according to an embodiment of this disclosure.

Based on FIG. 12, FIG. 14 is a schematic diagram of still another composition structure of a data transmission apparatus according to an embodiment of this disclosure. As shown in FIG. 14, the data transmission apparatus 30 provided in the embodiments of this disclosure further includes a receiving module 304 and a creation module 305.

The transmitting module 302 is further configured to transmit an LJ service request frame to the target station before the setting module sets the LJ tolerance of the LJ access category to the first tolerance value.

The receiving module 304 is configured to receive an LJ service response frame transmitted by the target station.

The creation module 305 is configured to create the LJ access category according to the LJ service response frame received by the receiving module 304.

In this embodiment of this disclosure, a method for creating the AC[LJ] is provided. Before an LJ tolerance of an LJ access category is set to a first tolerance value, the source station may further transmit an LJ service request frame to the target station, the source station then receives an LJ service response frame transmitted by the target station, and finally the source station creates the LJ access category according to the LJ service response frame. In the foregoing manner, the target station may create the AC[LJ] according to a request frame transmitted by the source station, so that a feasible manner of creating the AC[LJ] is provided.

Figure 15:
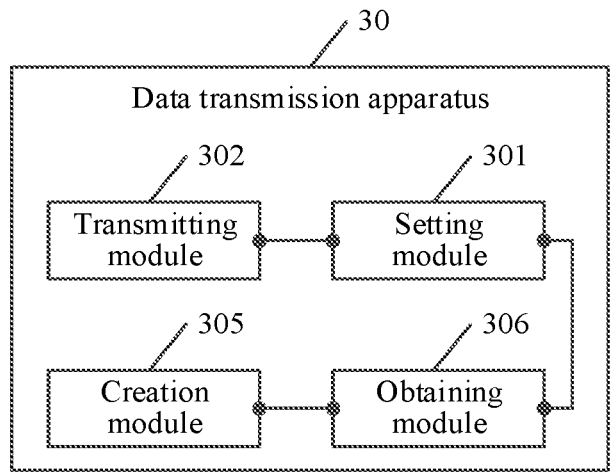
FIG. 15 is a schematic diagram of yet another composition structure of a data transmission apparatus according to an embodiment of this disclosure.

Based on FIG. 12, FIG. 15 is a schematic diagram of yet another composition structure of a data transmission apparatus according to an embodiment of this disclosure. As shown in FIG. 15, the data transmission apparatus 30 provided in the embodiments of this disclosure further includes an obtaining module 306 and a creation module 305.

The obtaining module 306 is configured to obtain a creation request before the setting module 301 sets the LJ tolerance of the LJ access category to the first tolerance value.

The creation module 305 is configured to create the LJ access category according to the creation request obtained by the obtaining module 306.

The transmitting module 302 is further configured to transmit an LJ service response frame to the target station.

In this embodiment of this disclosure, a method for creating the AC[LJ] is provided. Before an LJ tolerance of an LJ access category is set to a first tolerance value, the source station obtains a creation request from an upper layer, creates the LJ access category according to the creation request, and finally transmits an LJ service response frame to the target station. In the foregoing manner, the source station may create the AC[LJ] according to a request from the upper layer, so that another feasible manner of creating the AC[LJ] is provided, thereby improving the flexibility and the feasibility of the solution.

Figure 16:
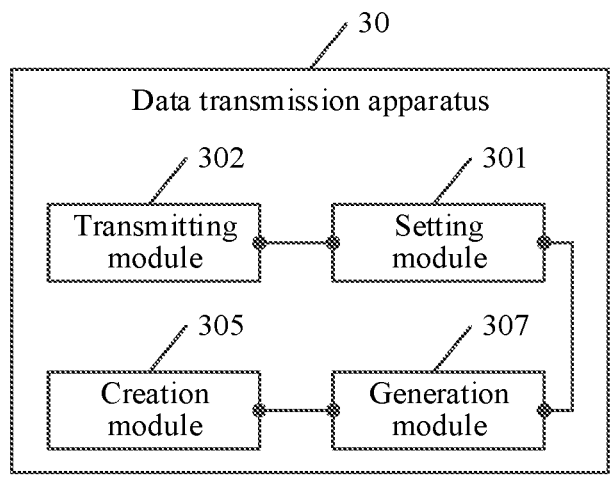
FIG. 16 is a schematic diagram of another composition structure of a data transmission apparatus according to an embodiment of this disclosure.

Based on FIG. 12, FIG. 16 is a schematic diagram of another composition structure of a data transmission apparatus according to an embodiment of this disclosure. As shown in FIG. 16, the data transmission apparatus 30 further includes a generation module 307 and a creation module 305.

The generation module 307 is configured to generate a creation request according to information about a source station before the setting module 301 sets the LJ tolerance of the LJ access category to the first tolerance value.

The creation module 305 is configured to create the LJ access category according to the creation request generated by the generation module 307.

The transmitting module 302 is further configured to transmit an LJ service response frame to the target station.

In this embodiment of this disclosure, a method for creating the AC[LJ] is provided. Before an LJ tolerance of an LJ access category is set to a first tolerance value, the source station generates a creation request according to information about the source station, creates the LJ access category according to the creation request, and finally transmits an LJ service response frame to the target station. In the foregoing manner, the source station may create the AC[LJ] according to the information about the source station, so that another feasible manner of creating the AC[LJ] is provided, thereby improving the flexibility and the feasibility of the solution.

Base on FIG. 12 to FIG. 16, in another embodiment of the data transmission apparatus 30 provided in the embodiments of this disclosure, the LJ service request frame or the LJ service response frame includes an LJ control parameter set, the LJ control parameter set including at least one of an identifier of the LJ access category, an address of the source station, an address of the target station, an address of a station supporting the LJ access category, an operation type, reason code, and a service priority field.

The LJ service request frame or the LJ service response frame includes an LJ parameter set, the LJ parameter set including at least one of the LJ tolerance, a survival time, a maximum frame length, and a maximum frame quantity, the survival time representing a survival upper limit of the LJ access category, the maximum frame length representing a data frame length upper limit supported by the LJ access category, the maximum frame quantity representing a quantity upper limit of data frames that the LJ access category is capable of storing simultaneously.

In this embodiment of this disclosure, it is defined that the LJ service request frame or the LJ service response frame may include an LJ control parameter set and an LJ parameter set, the LJ control parameter set including at least one of an identifier of the LJ access category, an address of the source station, an address of the target station, an address of a station supporting the LJ access category, an operation type, reason code, and a service priority field, the LJ parameter set including at least one of the LJ tolerance, a survival time, a maximum frame length, and a maximum frame quantity. A new mechanism is defined by using the parameters, to differentiate service priorities; a priority higher than that of an existing AC can be obtained by using the parameters, that is, a TXOP can be obtained in contention more quickly and more possibly for the LJ service.

Based on FIG. 12 to FIG. 16, in another embodiment of the data transmission apparatus 30 provided in the embodiments of this disclosure, the LJ service request frame or the LJ service response frame further includes EDCA parameters, the EDCA parameters including a minimum CA value, a maximum CA value, a TXOP limit, and an AIFS.

In this embodiment of this disclosure, the EDCA parameters that may be included in the LJ service request frame or the LJ service response frame are provided, that is, the EDCA parameters include a minimum CA value, a maximum CA value, a TXOP limit, and an AIFS. These parameters are applicable to a Wi-Fi environment under the current 802.11 protocol, thereby ensuring the applicability and the feasibility of the solution.

Figure 17:
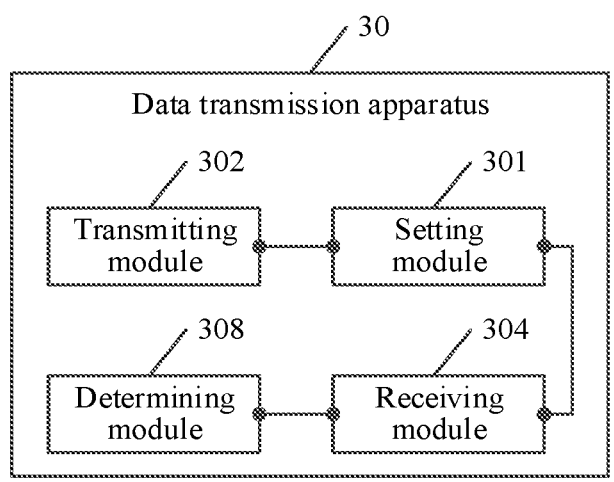
FIG. 17 is a schematic diagram of another composition structure of a data transmission apparatus according to an embodiment of this disclosure.

Based on FIG. 12, FIG. 17 is a schematic diagram of another composition structure of a data transmission apparatus according to an embodiment of this disclosure. As shown in FIG. 17, the data transmission apparatus 30 further includes a receiving module 304 and a determining module 308.

The receiving module 304 is configured to receive the data frame when the data frame enters the LJ access category and before the setting module 301 sets the LJ tolerance of the LJ access category to the first tolerance value.

The determining module 308 is configured to determine, when the data frame received by the receiving module 304 meets a data transmission condition, that the data frame enters the LJ access category.

The determining module 308 is further configured to determine, when the data frame received by the receiving module does not meet the data transmission condition, that the data frame enters a conventional access category, the conventional access category including at least one of a VO access category, a VI access category, a BE access category, and a BK access category.

In this embodiment of this disclosure, a data frame filtering method based on an AC[LJ] operation is provided. Before an LJ tolerance of an LJ access category is set to a first tolerance value, the station may further receive a data frame; determine, when the data frame meets a data transmission condition, that the data frame enters the LJ access category; and determine, when the data frame does not meet the data transmission condition, that the data frame enters a conventional access category, the conventional access category including at least one of a VO access category, a VI access category, a BE access category, and a BK access category. In the foregoing manner, the acceleration operation is performed only on the data frame meeting the data transmission condition, rather than on any type of data frame. Therefore, the use of the AC[LJ] is constrained by fully considering the fairness principle, thereby avoiding abuse of a priority mechanism.

Figure 18:
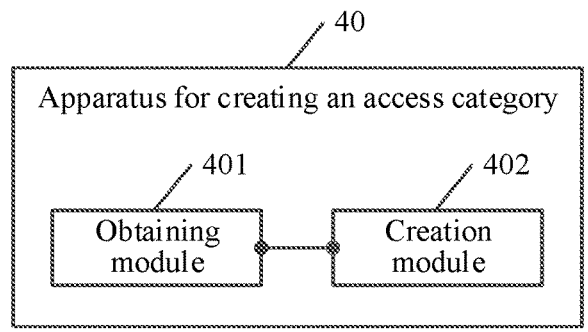
FIG. 18 is a schematic diagram of a composition structure of an apparatus for creating an access category according to an embodiment of this disclosure.

An apparatus for creating an access category in the embodiments of this disclosure is described below. FIG. 18 is a schematic diagram of a composition structure of an apparatus for creating an access category according to an embodiment of this disclosure. As shown in FIG. 18, the apparatus 40 for creating an access category includes:
- an obtaining module 401, configured to obtain an LJ associated parameter set, the LJ associated parameter set being used for indicating a data transmission condition supported by an LJ access category, the data transmission condition being a condition that is met for transmitting LJ service data; and
- a creation module 402, configured to create the LJ access category according to the LJ associated parameter set obtained by the obtaining module 401.

In this embodiment of this disclosure, the obtaining module 401 obtains an LJ associated parameter set, the LJ associated parameter set being used for indicating a data transmission condition supported by an LJ access category, the data transmission condition being a condition that is met for transmitting LJ service data, and the creation module 402 creates an LJ access category according to the LJ associated parameter set obtained by the obtaining module 401.

In this embodiment of this disclosure, a method for creating an AC[LJ] is provided. The station may obtain an LJ associated parameter set, the LJ associated parameter set being used for indicating a data transmission condition supported by an LJ access category, the data transmission condition being a condition that is met for transmitting LJ service data, and then the station creates an LJ access category according to the LJ associated parameter set. In the foregoing manner, a feasible manner of creating the AC[LJ] is provided, thereby improving the feasibility and the operability of the solution.

Based on FIG. 18, in the apparatus 40 for creating an access category provided in the embodiments of this disclosure, the LJ associated parameter set includes an LJ control parameter set and an LJ parameter set.

The LJ control parameter set includes at least one of an identifier of the LJ access category, an address of a source station, an address of a target station, an address of a station supporting the LJ access category, an operation type, reason code, and a service priority field.

The LJ parameter set includes at least one of an LJ tolerance, a survival time, a maximum frame length, and a maximum frame quantity, the survival time representing a survival upper limit of the LJ access category, the maximum frame length representing a data frame length upper limit supported by the LJ access category, the maximum frame quantity representing a quantity upper limit of data frames that the LJ access category is capable of storing simultaneously.

In this embodiment of this disclosure, it is defined that the LJ service request frame or the LJ service response frame may include an LJ control parameter set and an LJ parameter set, the LJ control parameter set including at least one of an identifier of the LJ access category, an address of the source station, an address of the target station, an address of a station supporting the LJ access category, an operation type, reason code, and a service priority field, the LJ parameter set including at least one of the LJ tolerance, a survival time, a maximum frame length, and a maximum frame quantity. A new mechanism is defined by using the parameters, to differentiate service priorities; a priority higher than that of an existing AC can be obtained by using the parameters, that is, a TXOP can be obtained in contention more quickly and more possibly for the LJ service.

Based on FIG. 18, in the apparatus 40 for creating an access category provided in the embodiments of this disclosure, the LJ associated parameter set further includes EDCA parameters, the EDCA parameters including a minimum value of a CA, a maximum CA value, a TXOP limit, and an AIFS.

In this embodiment of this disclosure, the EDCA parameters that may be included in the LJ service request frame or the LJ service response frame are defined, that is, the EDCA parameters include a minimum value of a CA, a maximum CA value, a TXOP limit, and an AIFS. These parameters are applicable to a Wi-Fi environment under the current 802.11 protocol, thereby ensuring the applicability and the feasibility of the solution.

Figure 19:
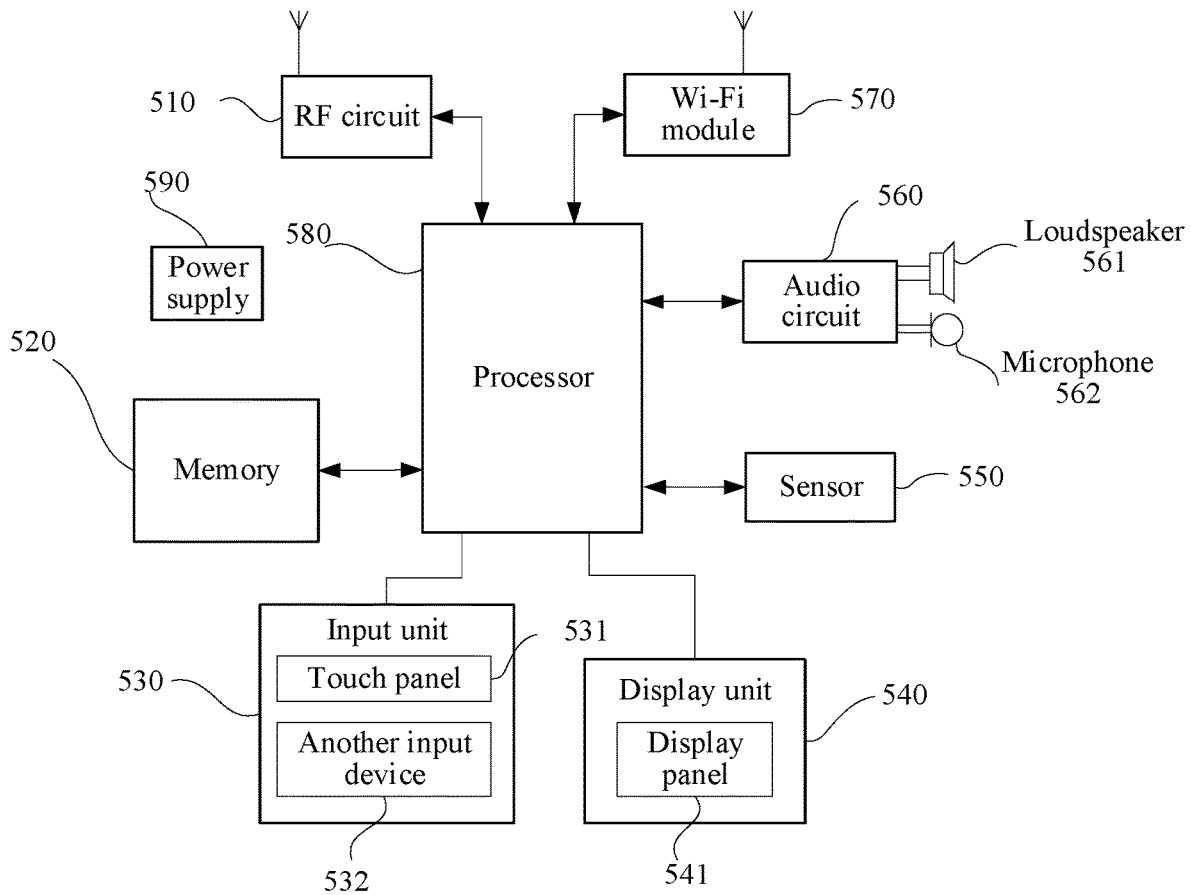
FIG. 19 is a schematic structural diagram of a station according to an embodiment of this disclosure.

The embodiments of this disclosure further provide another station. As shown in FIG. 19, for ease of description, only parts related to the embodiments of this disclosure are shown. For technical details that are not disclosed, refer to the method part in the embodiments of this disclosure. The station may be any terminal device including a mobile phone, a tablet computer, a personal digital assistant (PDA), a point of sales (POS), an on-board computer, and the like, and the station being a mobile phone is used as an example.

FIG. 19 is a block diagram of a partial structure of a mobile phone related to the station according to an embodiment of this disclosure. Referring to FIG. 19, the mobile phone includes components such as a radio frequency (RF) circuit 510, a memory 520, an input unit 530, a display unit 540, a sensor 550, an audio circuit 560, a Wi-Fi module 570, a processor 580, and a power supply 590. A person skilled in the art may understand that the structure of the mobile phone shown in FIG. 19 does not constitute a limitation on the mobile phone, and the mobile phone may include more or fewer components than those shown in the figure, or some components may be combined, or a different component deployment may be used.

The following describes the components of the mobile phone with reference to FIG. 19.

The RF circuit 510 may be configured to receive and transmit signals in an information receiving and transmitting process or a call process. Specifically, the RF circuit receives downlink information from a base station, then delivers the downlink information to the processor 580 for processing, and transmits designed uplink data to the base station. Generally, the RF circuit 510 includes, but is not limited to, an antenna, at least one amplifier, a transceiver, a coupler, a low noise amplifier (LNA), and a duplexer. In addition, the RF circuit 510 may also communicate with a network and another device through wireless communication. The wireless communication may use any communication standard or protocol, including but not limited to global system for mobile communication (GSM), general packet radio service (GPRS), code division multiple access (CDMA), wideband code division multiple access (WCDMA), long term evolution (LTE), email, short messaging service (SMS), and the like.

The memory 520 may be configured to store a software program and module. The processor 580 runs the software program and module stored in the memory 520, to implement various functional applications and data processing of the mobile phone. The memory 520 may include at least a program storage area and a data storage area, where the program storage area may store an operating system, an application program required by at least one function (for example, a sound playback function and an image display function), and the like; and the data storage area may store data (for example, audio data and a phone book) created according to use of the mobile phone, and the like. In addition, the memory 520 may include a high speed random access memory, and may also include a non-volatile memory such as at least one magnetic disk storage device, a flash memory, or another volatile solid-state storage device.

The input unit 530 may be configured to receive input digit or character information, and generate a key signal input related to the user setting and function control of the mobile phone. In an example, the input unit 530 may include a touch panel 531 and another input device 532. The touch panel 531, also referred to as a touchscreen, may collect a touch operation of a user on or near the touch panel (for example, an operation of a user on the touch panel 531 or near the touch panel 531 by using any suitable object or accessory such as a finger or a stylus), and drive a corresponding connection apparatus according to a preset program. In some embodiments, the touch panel 531 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and transmits the touch point coordinates to the processor 580. Moreover, the touch controller may receive and execute a command transmitted from the processor 580. In addition, the touch panel 531 may be a resistive, capacitive, infrared, or surface acoustic touch panel. Besides the touch panel 531, the input unit 530 may further include another input device 532. In an example, the another input device 532 may include, but is not limited to, one or more of a physical keyboard, a functional key (for example, a volume control key and a switch key), a track ball, a mouse, and a joystick.

The display unit 540 may be configured to display information input by the user or information provided for the user, and various menus of the mobile phone. The display unit 540 may include a display panel 541. For example, the display panel 541 may be configured in the form of a liquid crystal display (LCD), an organic light-emitting diode (OLED), or the like. In some embodiments, the touch panel 531 may cover the display panel 541. After detecting a touch operation on or near the touch panel, the touch panel 531 transfers the touch operation to the processor 580, so as to determine a type of the touch event. Then, the processor 580 provides corresponding visual output on the display panel 541 according to the type of the touch event. Although in FIG. 19, the touch panel 531 and the display panel 541 are used as two separate parts to implement input and output functions of the mobile phone, in some embodiments, the touch panel 531 and the display panel 541 may be integrated to implement the input and output functions of the mobile phone.

The mobile phone may further include at least one sensor 550 such as an optical sensor, a motion sensor, and other sensors. In an example, the optical sensor may include an ambient light sensor and a proximity sensor. The ambient light sensor may adjust luminance of the display panel 541 according to brightness of the ambient light. The proximity sensor may switch off the display panel 541 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone.

The audio circuit 560, a speaker 561, and a microphone 562 may provide audio interfaces between the user and the mobile phone. The audio circuit 560 may convert received audio data into an electrical signal and transmit the electrical signal to the speaker 561. The speaker 561 converts the electrical signal into a sound signal for output. On the other hand, the microphone 562 converts a collected sound signal into an electrical signal. The audio circuit 560 receives the electrical signal, converts the electrical signal into audio data, and outputs the audio data to the processor 580 for processing. Then, the processor transmits the audio data to, for example, another mobile phone by using the RF circuit 510, or outputs the audio data to the memory 520 for further processing.

Wi-Fi is a short distance wireless transmission technology. The mobile phone may help, by using the Wi-Fi module 570, a user to receive and transmit an e-mail, browse a web page, access streaming media, and the like, which provides wireless broadband Internet access for the user. Although FIG. 19 shows the Wi-Fi module 570, it may be understood that the Wi-Fi module is not a necessary component of the mobile phone, and the Wi-Fi module may be omitted as required provided that the scope of the essence of the present disclosure is not changed.

The processor 580 is the control center of the mobile phone, and is connected to various parts of the mobile phone by using various interfaces and lines. By running or executing the software program and/or module stored in the memory 520, and invoking data stored in the memory 520, the processor performs various functions and data processing of the mobile phone, thereby performing overall monitoring on the mobile phone. The processor 580 may include one or more processing units. In an example, the processor 580 may integrate an application processor and a modem processor. The application processor mainly processes an operating system, a user interface, an application program, and the like. The modem processor mainly processes wireless communication. It may be understood that the foregoing modem may either not be integrated into the processor 580.

The mobile phone further includes the power supply 590 (such as a battery) for supplying power to the components. The power supply may be logically connected to the processor 580 by using a power management system, thereby implementing functions such as charging, discharging, and power consumption management by using the power management system.

Although not shown in the figure, the mobile phone may further include a camera, a Bluetooth module, and the like.

In this embodiment of this disclosure, the processor 580 included in the station further has the following functions:

setting, when a data frame enters an LJ access category, an LJ tolerance of the LJ access category to a first tolerance value, the LJ tolerance representing a transmission latency upper limit of the LJ access category;

setting the LJ tolerance to a second tolerance value and setting a backoff count of the LJ access category from a first backoff value to a second backoff value, when the LJ tolerance decreases to 0, the second tolerance value being less than or equal to the first tolerance value, the second backoff value being less than the first backoff value, the first backoff value being a backoff value corresponding to a case that the LJ tolerance decreases to 0; and transmitting the data frame to a target station by using the LJ access category when the backoff count decreases to 0.

In some embodiments, the processor 580 included in the station is further configured to perform the following steps:

resetting the LJ tolerance to the first tolerance value and setting the backoff count from the first backoff value to the second backoff value, when the data frame enters the LJ access category and at least one data frame already exists in the LJ access category.

In some embodiments, the processor 580 included in the station is further configured to perform the following steps:

eliminating the LJ access category when entering of X data frames to the LJ access category does not occur within a survival time, the survival time representing a survival upper limit of the LJ access category, X being an integer greater than or equal to 1; and eliminating the LJ access category when a quantity of data frames in the LJ access category is greater than or equal to a maximum frame quantity, the maximum frame quantity representing a quantity upper limit of data frames stored in the LJ access category simultaneously.

In some embodiments, the processor 580 included in the station is further configured to perform the following steps:

transmitting an LJ service request frame to the target station;

receiving an LJ service response frame transmitted by the target station; and creating the LJ access category according to the LJ service response frame.

In some embodiments, the processor 580 included in the station is further configured to perform the following steps:

obtaining a creation request;

creating the LJ access category according to the creation request; and transmitting an LJ service response frame to the target station.

In some embodiments, the processor 580 included in the station is further configured to perform the following steps:

generating a creation request according to information about a source station;

creating the LJ access category according to the creation request; and transmitting an LJ service response frame to the target station.

In some embodiments, the processor 580 included in the station is further configured to perform the following steps:

receiving the data frame;

determining, when the data frame meets a data transmission condition, that the data frame enters the LJ access category; and determining, when the data frame does not meet the data transmission condition, that the data frame enters a conventional access category, the conventional access category including at least one of a VO access category, a VI access category, a BE access category, and a BK access category.

In this embodiment of this disclosure, the processor 580 included in the station further has the following functions:

obtaining an LJ associated parameter set, the LJ associated parameter set being used for indicating a data transmission condition supported by an LJ access category, the data transmission condition being a condition that is met for transmitting LJ service data; and creating the LJ access category according to the LJ associated parameter set.

Figure 20:
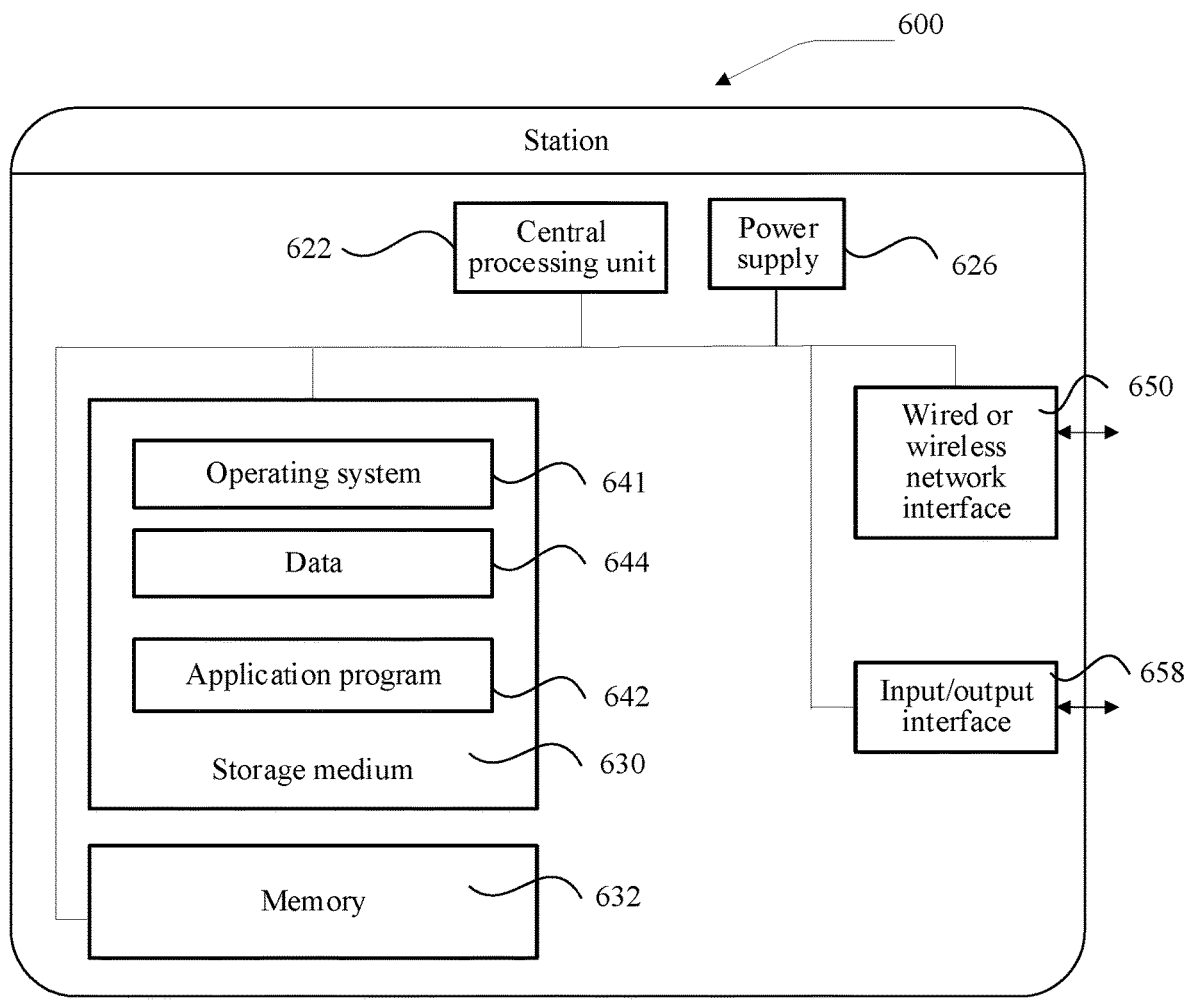
FIG. 20 is another schematic structural diagram of a station according to an embodiment of this disclosure.

FIG. 20 is a schematic structural diagram of a station according to an embodiment of this disclosure. The station 600 may vary greatly due to different configurations or performance, and may include one or more central processing units (CPUs) 622 (for example, one or more processors) and a memory 632, and one or more storage media 630 (for example, one or more mass storage devices) that store application programs 642 or data 644. The memory 632 and the storage medium 630 may be transient storage or permanent storage. The program stored in the storage medium 630 may include one or more modules (not marked in the figure), and each module may include a series of instruction operations to the station. In some embodiments of this disclosure, the CPU 622 may be configured to communicate with the storage medium 630 to perform the series of instruction operations in the storage medium 630 on the station 600.

The station 600 may further include one or more power sources 626, one or more wired or wireless network interfaces 650, one or more input/output interfaces 658, and/or one or more operating systems 641 such as Windows Server™, Mac OS X™, Unix™, Linux™, FreeBSD™, or the like.

The steps performed by the station in the foregoing embodiment may be based on the structure of the station shown in FIG. 20.

In this embodiment of this disclosure, the CPU 622 included in the station further has the following functions:

setting, when a data frame enters an LJ access category, an LJ tolerance of the LJ access category to a first tolerance value, the LJ tolerance representing a transmission latency upper limit of the LJ access category;

setting the LJ tolerance to a second tolerance value and setting a backoff count of the LJ access category from a first backoff value to a second backoff value, when the LJ tolerance decreases to 0, the second tolerance value being less than or equal to the first tolerance value, the second backoff value being less than the first backoff value, the first backoff value being a backoff value corresponding to a case that the LJ tolerance decreases to 0; and transmitting the data frame to a target station by using the LJ access category when the backoff count decreases to 0.

In some embodiments, the CPU 622 included in the station is further configured to perform the following step:

resetting the LJ tolerance to the first tolerance value and setting the backoff count from the first backoff value to the second backoff value, when the data frame enters the LJ access category and at least one data frame already exists in the LJ access category.

In some embodiments, the CPU 622 included in the station is further configured to perform the following steps:

eliminating the LJ access category when no data frame enters the LJ access category within a survival time, the survival time representing a survival upper limit of the LJ access category; and eliminating the LJ access category when a quantity of data frames in the LJ access category is greater than or equal to a maximum frame quantity, the maximum frame quantity representing a quantity upper limit of data frames stored in the LJ access category simultaneously.

In some embodiments, the CPU 622 included in the station is further configured to perform the following steps:
transmitting an LJ service request frame to the target station;
receiving an LJ service response frame transmitted by the target station; and creating the LJ access category according to the LJ service response frame.

In some embodiments, the CPU 622 included in the station is further configured to perform the following steps:
obtaining a creation request;
creating the LJ access category according to the creation request; and transmitting an LJ service response frame to the target station.

In some embodiments, the CPU 622 included in the station is further configured to perform the following steps:
generating a creation request according to information about a source station;
creating the LJ access category according to the creation request; and transmitting an LJ service response frame to the target station.

In some embodiments, the CPU 622 included in the station is further configured to perform the following steps:
receiving the data frame;
determining, when the data frame meets a data transmission condition, that the data frame enters the LJ access category; and
determining, when the data frame does not meet the data transmission condition, that the data frame enters a conventional access category, the conventional access category including at least one of a VO access category, a VI access category, a BE access category, and a BK access category.

In this embodiment of this disclosure, the CPU 622 included in the station further has the following functions:
obtaining an LJ associated parameter set, the LJ associated parameter set being used for indicating a data transmission condition supported by an LJ access category, the data transmission condition being a condition that is met for transmitting LJ service data; and
creating the LJ access category according to the LJ associated parameter set.

A person skilled in the art can clearly understand that for convenience and conciseness of description, for specific working processes of the foregoing described system, apparatus and unit, refer to the corresponding processes in the foregoing method embodiments.

In the several embodiments provided in this disclosure, it is to be understood that the disclosed system, apparatus, and method may be implemented in other manners. In addition, functional units in the embodiments of this disclosure may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. The computer-readable storage medium stores computer instructions, the executable instructions, when run on a computer, causing the computer to perform the method provided in the foregoing embodiments. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this disclosure, but not for limiting this disclosure. Although this disclosure is described in detail with reference to the foregoing embodiments, a person of ordinary skill in the art is to understand that they may still make modifications to the technical solutions described in the foregoing embodiments or make equivalent replacements to some technical features thereof, without departing from the spirit and scope of the technical solutions of the embodiments of this disclosure.

INDUSTRIAL PRACTICABILITY

In the embodiments of this disclosure, when a data frame enters an LJ access category, an LJ tolerance of the LJ access category is set to a first tolerance value, the LJ tolerance representing a transmission latency upper limit of the LJ access category; the LJ tolerance is set to a second tolerance value and a backoff count of the LJ access category is set from a first backoff value to a second backoff value when the LJ tolerance decreases to 0, the second tolerance value being less than or equal to the first tolerance value, the second backoff value being less than the first backoff value, the first backoff value being a backoff value corresponding to a case that the U tolerance decreases to 0; and the data frame is transmitted to a target station by using the LJ access category when the backoff count decreases to 0. In this way, a tolerance value corresponding to the LJ tolerance can be dynamically adjusted, and a backoff value corresponding to the backoff count can be dynamically reduced, thereby increasing the flexibility of the backoff and providing more reliable quality of service for an LJ service.

What is claimed is:

1. A data transmission method, comprising:
in response to a data frame entering a low jitter (LJ) access category, setting an LJ tolerance of the LJ access category to a first tolerance value, the LJ tolerance representing a transmission latency upper limit of the LJ access category;
in response to a value of the LJ tolerance decreasing to zero, setting the LJ tolerance to a second tolerance value and setting a backoff count of the LJ access category from a first backoff value to a second backoff value, the second tolerance value being less than or equal to the first tolerance value, the second backoff value being less than the first backoff value, the first backoff value being a value of the backoff count when the LJ tolerance decreases to zero; and
transmitting the data frame to a target station using the LJ access category in response to the backoff count decreasing to zero.

2. The data transmission method of claim 1, further comprising:
resetting the LJ tolerance to the first tolerance value and setting the backoff count from the first backoff value to the second backoff value in response to the data frame entering the LJ access category and at least one data frame already existing in the LJ access category.

3. The data transmission method of claim 1, further comprising
eliminating the LJ access category in response to less than X data frames entering the LJ access category within a survival time, the survival time representing a survival upper limit of the LJ access category, X being an integer greater than or equal to 1; and eliminating the LJ access category in response to a quantity of data frames in the LJ access category being greater than or equal to a maximum frame quantity, the maximum frame quantity representing a quantity upper limit of data frames that the LJ access category is able to store simultaneously.

4. The data transmission method of claim 1, wherein before the setting the LJ tolerance of the LJ access category to the first tolerance value, the method further comprises:
transmitting an LJ service request frame to the target station;
receiving an LJ service response frame transmitted by the target station; and
creating the LJ access category according to the LJ service response frame.

5. The data transmission method of claim 1, wherein before the setting the LJ tolerance of the LJ access category to the first tolerance value, the method further comprises:
obtaining a creation request;
creating the LJ access category according to the creation request; and
transmitting an LJ service response frame to the target station.

6. The data transmission method of claim 1, wherein before the setting the LJ tolerance of the LI access category to the first tolerance value, the method further comprises:
generating a creation request according to information on a source station;
creating the LJ access category according to the creation request; and
transmitting an LJ service response frame to the target station.

7. The data transmission method of claim 4, wherein the LJ service request frame or the LJ service response frame comprises an LJ control parameter set, the LJ control parameter set comprising at least one of an identifier of the LJ access category, an address of the source station, an address of the target station, an address of a station supporting the LJ access category, an operation type, reason code, or a service priority field; and
the LJ service request frame or the LJ service response frame comprises an LJ parameter set, the LJ parameter set comprising at least one of the LJ tolerance, a survival time, a maximum frame length, or a maximum frame quantity, the survival time representing a survival upper limit of the LJ access category, the maximum frame length representing a data frame length upper limit supported by the LJ access category, the maximum frame quantity representing a quantity upper limit of data frames that the LJ access category is able to store simultaneously.

8. The data transmission method of claim 7, wherein the LJ service request frame or the LJ service response frame further comprises enhanced distributed channel access (EDCA) parameters, the EDCA parameters comprising a minimum contention window (CA) value, a maximum CA value, a transmit opportunity (TXOP) limit, and an arbitration inter-frame space (AIFS).

9. The data transmission method of claim 1, wherein before the setting the LJ tolerance of the LJ access category to the first tolerance value, the method further comprises:
receiving the data frame;
in response to the data frame meeting a data transmission condition, determining that the data frame enters the LJ access category;
in response to the data frame failing to meet the data transmission condition, determining that the data frame enters a conventional access category, the conventional access category comprising at least one of a voice (VO) access category, a video (VI) access category, a best effort (BE) access category, or a background (BK) access category.

10. A method for creating an access category, comprising:
obtaining a low jitter (LJ) associated parameter set, the LJ associated parameter set being for indicating a data transmission condition supported by an LJ access category, the data transmission condition being a condition to be met for transmitting LJ service data;
determining whether to create a LJ access category based on a network condition or transmitting frequency of data frames; and
in response to determining to create the LJ access category, creating the U access category according to the LJ associated parameter set.

11. The method of claim 10, wherein the LJ associated parameter set comprises an LJ control parameter set and an LJ parameter set;
the LJ control parameter set comprises at least one of an identifier of the LJ access category, an address of a source station, an address of a target station, an address of a station supporting the LJ access category, an operation type, reason code, or a service priority field; and
the LJ parameter set comprises at least one of an LJ tolerance, a survival time, a maximum frame length, or a maximum frame quantity, the survival time representing a survival upper limit of the LJ access category, the maximum frame length representing a data frame length upper limit supported by the LJ access category, the maximum frame quantity representing a quantity upper limit of data frames that the LJ access category is able to store simultaneously.

12. The method of claim 11, wherein the LJ associated parameter set further comprises enhanced distributed channel access (EDCA) parameters, the EDCA parameters comprising a minimum contention window (CA) value, a maximum CA value, a transmit opportunity (TXOP) limit, and an arbitration inter-frame space (AIFS).

13. A data transmission apparatus, comprising:
a memory operable to store computer-readable instructions; and
a processor operable to read the computer-readable instructions, the processor when executing the computer-readable instructions is configured to:
in response to a data frame entering a low jitter (UJ) access category, set an U tolerance of the LI access category to a first tolerance value, the LJ tolerance representing a transmission latency upper limit of the LJ access category;
in response to a value of the LJ tolerance decreasing to zero, set the LI tolerance to a second tolerance value and set a backoff count of the LI access category from a first backoff value to a second backoff value, the second tolerance value being less than or equal to the first tolerance value, the second backoff value being less than the first backoff value, the first backoff value being a value of the backoff count when the LJ tolerance decreases to zero; and
transmit the data frame to a target station using the LJ access category in response to the backoff count decreasing to zero.

14. The data transmission apparatus of claim 13, wherein the processor is further configured to:

reset the LJ tolerance to the first tolerance value and set the backoff count from the first backoff value to the second backoff value in response to the data frame entering the LJ access category and at least one data frame already existing in the LJ access category.

15. The data transmission apparatus of claim 13, wherein the processor is further configured to:
   eliminate the LJ access category in response to less than X data frames entering the LJ access category within a survival time, the survival time representing a survival upper limit of the LJ access category, X being an integer greater than or equal to 1; and
   eliminate the LJ access category in response to a quantity of data frames in the LJ access category being greater than or equal to a maximum frame quantity, the maximum frame quantity representing a quantity upper limit of data frames that the LI access category is able to store simultaneously.

16. The data transmission apparatus of claim 13, wherein the processor is further configured to:
   transmit an LJ service request frame to the target station;
   receive an LJ service response frame transmitted by the target station; and
   create the LJ access category according to the LJ service response frame.

17. The data transmission apparatus of claim 13, wherein the processor is further configured to:
   obtain a creation request;
   create the LJ access category according to the creation request; and
   transmit an LJ service response frame to the target station.

18. The data transmission apparatus of claim 13, wherein the processor is further configured to:
   generate a creation request according to information on a source station;
   create the LJ access category according to the creation request; and
   transmit an LJ service response frame to the target station.

19. The data transmission apparatus of claim 13, wherein processor is further configured to:
   receive the data frame;
   in response to the data frame meeting a data transmission condition, determine that the data frame enters the LJ access category;
   in response to the data frame failing to meet the data transmission condition, determine that the data frame enters a conventional access category, the conventional access category comprising at least one of a voice (VO) access category, a video (VI) access category, a best effort (BE) access category, or a background (BK) access category.

20. A non-transitory computer-readable storage medium, having processor executable instructions stored thereon for causing a processor to:
   in response to a data frame entering a low jitter (LJ) access category, set an LJ tolerance of the LJ access category to a first tolerance value, the LJ tolerance representing a transmission latency upper limit of the LJ access category;
   in response to a value of the LJ tolerance decreasing to zero, set the LJ tolerance to a second tolerance value and set a backoff count of the LJ access category from a first backoff value to a second backoff value, the second tolerance value being less than or equal to the first tolerance value, the second backoff value being less than the first backoff value, the first backoff value being a value of the backoff count when the LJ tolerance decreases to zero; and
   transmit the data frame to a target station using the LJ access category in response to the backoff count decreasing to zero.

* * * * *

UNITED STATES PATENT AND TRADEMARK OFFICE
CERTIFICATE OF CORRECTION

PATENT NO. : 12,075,470 B2  
APPLICATION NO. : 17/358204  
DATED : August 27, 2024  
INVENTOR(S) : Jingjing Hao et al.

Page 1 of 1

It is certified that error appears in the above-identified patent and that said Letters Patent is hereby corrected as shown below:

In the Claims

Column 33, Claim 6, Line 25, delete "LI" and replace with --LJ--

Column 34, Claim 13, Line 49, delete "(UJ)" and replace with --(LJ)--

Column 34, Claim 13, Line 50, delete "U" and replace with --LJ--

Column 34, Claim 13, Line 50, delete "LI" and replace with --LJ--

Column 34, Claim 13, Line 55, delete "LI" and replace with --LJ--

Column 34, Claim 13, Line 56, delete "LI" and replace with --LJ--

Column 35, Claim 15, Line 16, delete "LI" and replace with --LJ--

Signed and Sealed this  
Thirty-first Day of December, 2024

Derrick Brent  
*Acting Director of the United States Patent and Trademark Office*